US012523379B2

(12) United States Patent
Sarhan et al.

(10) Patent No.: US 12,523,379 B2
(45) Date of Patent: Jan. 13, 2026

(54) WATER HEATING SYSTEM

(71) Applicants: Sohad Sarhan, Kfar Maghar (IL); Joul Sarhan, Kfar Maghar (IL)

(72) Inventors: Sohad Sarhan, Kfar Maghar (IL); Joul Sarhan, Kfar Maghar (IL)

( * ) Notice: Subject to any disclaimer, the term of this patent is extended or adjusted under 35 U.S.C. 154(b) by 551 days.

(21) Appl. No.: 17/922,611

(22) PCT Filed: May 6, 2021

(86) PCT No.: PCT/IL2021/050520
§ 371 (c)(1),
(2) Date: Nov. 1, 2022

(87) PCT Pub. No.: WO2021/224926
PCT Pub. Date: Nov. 11, 2021

(65) Prior Publication Data
US 2023/0167982 A1 Jun. 1, 2023

(30) Foreign Application Priority Data
May 6, 2020 (IL) .......................................... 274509

(51) Int. Cl.
*F24D 17/00* (2022.01)
*E03B 7/04* (2006.01)
(Continued)

(52) U.S. Cl.
CPC .......... *F24D 17/0068* (2013.01); *E03B 7/045* (2013.01); *F16K 11/022* (2013.01);
(Continued)

(58) Field of Classification Search
CPC ...... F24H 15/174; F24H 15/37; F24H 15/242; F24H 15/219; F24H 1/202; F24D 17/0068; F24D 19/1051; F24D 2200/14
See application file for complete search history.

(56) References Cited

U.S. PATENT DOCUMENTS

| 6,246,831 B1 | 6/2001 | Seitz et al. |
| 6,354,813 B1 | 3/2002 | Laing |

(Continued)

FOREIGN PATENT DOCUMENTS

| AU | 2016225782 A1 | 3/2017 |
| CN | 201237299 Y | 5/2009 |

(Continued)

OTHER PUBLICATIONS

International Search Report for corresponding application PCT/IL2021/050520 filed May 6, 2021; Report dated Aug. 22, 2021.
(Continued)

*Primary Examiner* — Ko-Wei Lin
(74) *Attorney, Agent, or Firm* — CANTOR COLBURN LLP

(57) ABSTRACT

The present disclosure provides a water heating system for efficient heating of water for immediate use that fits either to industrial applications or household applications. The water heating system is suitable to be combined with a solar heating unit and it can be operated on electric power or on gas-based heating units for providing hot water to multiple consumers for household or industrial utilization. Furthermore, the system can be stand-alone, operating without any additional water heating system and can provide an immediate stream of hot water, e.g. it can be installed within a water supplying appliance. The water can operate in two modes: (1) heating for immediate use of hot water; and (2) heating water to be contained in a reservoir for later use. The system uses a two (bi) directional flow valve.

20 Claims, 18 Drawing Sheets

(51) Int. Cl.
    *F16K 11/02* (2006.01)
    *F24D 19/00* (2006.01)
    *F24D 19/10* (2006.01)
    *F24H 1/20* (2022.01)
    *F24H 9/00* (2022.01)
    *F24H 15/215* (2022.01)
    *F24H 15/219* (2022.01)
    *F24H 15/242* (2022.01)
    *F24H 15/32* (2022.01)
    *F24H 15/37* (2022.01)
    *G05D 16/10* (2006.01)
    *G05D 23/19* (2006.01)
    *F24H 15/14* (2022.01)
    *F24H 15/174* (2022.01)
    *F24H 15/223* (2022.01)
    *F24H 15/281* (2022.01)

(52) U.S. Cl.
    CPC ..... *F24D 19/0092* (2013.01); *F24D 19/1036* (2013.01); *F24D 19/1057* (2013.01); *F24H 1/201* (2013.01); *F24H 9/0021* (2013.01); *F24H 15/215* (2022.01); *F24H 15/219* (2022.01); *F24H 15/242* (2022.01); *F24H 15/32* (2022.01); *F24H 15/37* (2022.01); *G05D 16/101* (2019.01); *G05D 23/1934* (2013.01); *F24D 2220/0207* (2013.01); *F24D 2220/0271* (2013.01); *F24H 15/14* (2022.01); *F24H 15/174* (2022.01); *F24H 15/223* (2022.01); *F24H 15/281* (2022.01)

(56) References Cited

U.S. PATENT DOCUMENTS

| | | | |
|---|---|---|---|
| 6,779,552 B1 * | 8/2004 | Coffman | ............... F16K 15/18 137/563 |
| 10,253,991 B2 | 4/2019 | Klier | |
| 2009/0230200 A1 | 9/2009 | Kempf | |

FOREIGN PATENT DOCUMENTS

| | | |
|---|---|---|
| CN | 201348365 Y | 11/2009 |
| CN | 102818307 A | 12/2012 |
| CN | 203615477 U | 5/2014 |
| CN | 203758038 U | 8/2014 |
| CN | 207540175 U | 6/2018 |
| EP | 2014921 A1 | 1/2009 |
| EP | 2669593 A1 | 12/2013 |
| GB | 2560360 A | 9/2018 |
| KR | 200432063 Y1 | 11/2006 |
| RU | 1793161 C | 2/1993 |
| WO | 2020120385 A1 | 6/2020 |

OTHER PUBLICATIONS

Written Opinion for corresponding application PCT/IL2021/050520 filed May 6, 2021; Report dated Aug. 22, 2021.

* cited by examiner

WATER HEATING SYSTEM

TECHNOLOGICAL FIELD

The present disclosure is in the field of water heating systems.

BACKGROUND

Demand for immediate hot water for household use is increasing. Until now there is no safe solution for immediate and efficient heating of cold water from any low temperature to a desired temperature that is sufficient for the hot water consumer.

GENERAL DESCRIPTION

The present disclosure provides a water heating system for efficient heating of water for immediate use that fits either to industrial applications or household applications. The water heating system is suitable to be combined with a solar heating unit and it can be operated on electric power or on gas-based heating units for providing hot water to multiple consumers for household or industrial utilization. Furthermore, the system can be stand-alone, operating without any additional water heating system and can provide an immediate stream of hot water, e.g. it can be installed within a water supplying appliance. The water can operate in two modes: (1) heating for immediate use of hot water; and (2) heating water to be contained in a reservoir for later use. The water heating system includes a first heating unit that operates by a controlled power supply, e.g. powered by electricity or gas. The first heating unit includes one or more heating bodies, which can be any type of known heating bodies such as electrodes, that are configured to heat respective heating volumes, each heating volume is linked to a feed of fresh cold water from a water source. The heated water from the heating volumes circulates to a water reservoir to be stored therein while there is no water consumption from the system. It is to be noted that the water heating system may be disposed external to the water reservoir or within the water reservoir. Upon a demand of hot water by a consumer, the water flows from the water reservoir along a flow path through each of the heating volumes, which are disposed in series with respect to one another. The water temperature is monitored along different locations of the flow path and if the water reaches a heating volume under a predefined temperature, the heating body is activated and heat the water during their flow to the consumer. In some embodiments of the system, one or more heating body may operate constantly irrespective to the water temperature. Thus, each water bulk is being heated at least twice, once when it is fed to the heating volume and then circulates to the water reservoir, and second when it flows towards a hot water outlet to a water consumer and passes through one or more heating volumes that are associated with activated heated bodies. It is to be noted that similar to conventional water heating systems, the operation of the heating bodies are regulated by at least one of the followings: (1) time-dependent switch controlled by the user; and/or (2) a thermostat disposed in the water reservoir that is configured to sense the temperature at a certain level of the water reservoir, typically at the bottom portion, and seize the operation of the heating body when reaching to a certain threshold of temperature.

Therefore, an aspect of the present disclosure provides a water heating system that is linked to a water reservoir. The water heating system includes a first heating unit, typically operated by electricity, including electricity that is produced by solar energy, gas, fuel or any other non-renewable energy source. The first heating unit includes a lead water-heating body configured for heating water in a lead heating volume, namely a volume of water that surrounds the heating body which is being heated by the operation of the heating body and comes into thermal contact therewith for allowing exchange of heat. The heating unit further includes at least one inlet for receiving a feed of cold water, i.e. a feed of water from the water supply network or water from a bottom portion of a water reservoir, into the lead heating volume. A hot-water outlet is located in the first heating unit downstream the lead water heating volume for allowing discharge of hot water from the heating unit towards a consumer or a consuming utility. The term "downstream" refers to the flow path that is defined by the flow when there is consumption of hot water and water flows through the outlet to a consumer. The heating unit includes a two-directional port, upstream the lead heating volume and different than the inlet and outlet, for allowing two directional water flow depending the water pressure difference in the system. It is to be understood that the two-directional port is not necessary a physical component that can be discerned from other components in the system and it can be merely a passage that allows two-directional flow therethrough. Namely, it is a passive component and it can be interchanged with the term "two-directional passage". In one state of the system, when the water pressure in the system is substantially equal, namely when there is not hot water consumption from the system by a consumer that causes a flow of water through the hot water outlet, the water flows via the two-directional port from the lead heating volume to be contained in a water reservoir, typically its top portion to facilitate later use of the heated water since the hot water are lighter and flows upwardly. In a second state of the system, when there is a pressure difference in the system that causes water outflow through the hot water outlet towards a consumer, water flows via the two-directional port towards the lead heating volume. Typically, the water that flows towards the lead heating volume are water that were heated either by the lead heating body and circulated to the reservoir or were heated by a solar heating unit and fed to the top portion of the reservoir.

The two directional port may link between a top portion of a water reservoir, which receives heated water thereto due to hot water circulation, and the first heating unit, which receives water from the top portion of the water reservoir upon a decrease of water pressure at the outlet of the heating unit, namely hot water consumption by a consumer, which causes the water from the top portion to flow through heating unit and undergoes further heating by at least the lead water-heating body and optionally more heating bodies.

In some embodiments, the water heating system includes a pressure sensitive sensor that operatively connected to at least one heating body in the system, lead heating body and/or following heating body. The pressure sensitive sensor regulates the power supply to the at least one heating body operatively connected thereto such that upon sensing a pressure difference above a certain threshold, it opens the power supply to the at least one heating body. Thus, when hot water are consumed by a consumer, the at least one heating body receives powers supply and may activate to heat the water that flows through the respective heating volume. It is to be noted that in order for a heating body to be activated, several other conditions may need to be satisfied, for example the temperature of the flowing water through the respective heating volume needs to be lower than a certain threshold.

In some embodiments of the system, the heating unit includes one or more following heating bodies configured for heating respective following heating volumes that are disposed downstream the lead heating volume and upstream the hot-water outlet. The water-flow direction is defined by the flow of water upon consumption of hot water. Thus, the system components order from the most upstream component to the most downstream component is: water reservoir (not necessarily part of the system), lead water-heating volume, following heating volumes, hot-water outlet. The inlet is typically disposed upstream to the lead water-heating volume and in some embodiments may be disposed between the lead water-heating volume and the first following heating volume. The one or more following heating bodies are switchable between active and non-active modes, namely, active mode for heating the water flowing in the respective following heating volume and passive mode with no consumption of energy when water that flows through the respective following heating volume is not heated. The heating volumes are connected in series to and in fluid communication with the lead heating volume and one another, namely the water flows from the lead heating volume to a first following heating volume then to a second heating volume, third heating volume, etc. until reaching the hot water outlet.

In some embodiments of the system, each of the one or more following heating bodies is associated with a respective temperature sensor configured to sense the temperature of the water at a respective following heating volume and/or along a flow path between a respective following heating volume and a most proximate upstream heating body, i.e. the nearest heating body upstream thereto that may be either a lead heating body or a following heating body. Each of the one or more following heating bodies is configured to switch to active mode, namely heat the water in the respective following heating volume upon sensing a temperature below a selected value in the respective temperature sensor.

In some embodiments of the system, the one or more following heating bodies are configured to switch to active mode when the water pressure difference in the system exceeds a predetermined value, or a flow rate above a certain threshold. In other words, in a mode operation of the system, the one or more following bodies are having two levels of control: (i) a first level of control is pressure dependent such that the following heating bodies are non-active when the water pressure difference is lower than a predefined value; and (ii) a second level of control is temperature dependent such that the following heating bodies are non-active when their associated sensor senses a temperature above a predefined temperature value. Therefore, the activation of the heating body by the temperature sensor depends on the pressure difference/flow rate in the system.

In some embodiments, the system includes a pressure-dependent switch configured to transmit power supply to the one or more following heating bodies upon sensing a pressure difference above a selected threshold at a selected location in the system and to disconnect power supply upon sensing a pressure difference in the system below said selected threshold. It is to be noted that the sensing of the pressure difference may be at any desired location in the system.

In some embodiments, the system further includes a manifold for directing a feed of water from the inlet towards one side that includes the lead water-heating body and towards a second side that includes the first following heating body. The feed of water splits to two sides and comes into thermal contact with the lead water-heating body and the first following heating body. In case the two heating bodies are operating, heated water circulates to the water reservoir through respective ports and conduits. A second pressure-sensitive valve is disposed at a following port, which permits circulation of hot water from the first following heating volume towards a top portion of the water reservoir, or between a following port and the water reservoir. The second pressure-sensitive valve is configured for switching between an open state, allowing flow of water therethrough, and a blocking state, blocking a flow of water therethrough, upon exceeding a predefined value of water pressure difference or flow rate therethrough.

It is to be noted that the term "pressure-sensitive valve" encompasses mechanical-based and electrical-based valves that are sensitive to pressure or flow and are configured to switch states, namely direct flow to different destinations, in response to different pressure or flow rate profiles.

In some embodiments of the system, the one or more following heating bodies includes at least a first and second following heating bodies. The system further includes a following port linking between the first and second following heating volumes and a top portion of a water reservoir, said following port comprises a following pressure-sensitive valve for blocking a flow of water when the pressure difference in the following port is above a selected threshold.

In some embodiments, the system includes a second inlet for feeding cold water to the second following heating volume. A third pressure-sensitive valve is disposed at the second inlet, or proximate thereto, for blocking a feed of water when the pressure difference in the following port is above a selected threshold, namely when there is a water outflow through the hot water outlet.

In some embodiments of the system, the flow path through the lead heating volume, the first and second following heating volumes defines a serpentine flow path. The two-directional port and the following port are disposed at high portions of the serpentine.

In some embodiments, the system further includes a first pressure-sensitive valve disposed at or upstream the at least one inlet and configured for switching between an open state to a blocking state upon exceeding a selected threshold of water pressure difference or flow rate therethrough such that when the pressure-sensitive valve is in open state, water are being heated by the one or more heating bodies and circulates to the top portion of the water reservoir and when the pressure-sensitive valve is in blocking state, water flows from the top portion of the reservoir toward the heating unit and being heated by the one or more heating bodies while flowing towards the hot-water outlet along their flow path. the first pressure-sensitive valve is disposed such that it controls the ingress of fresh cold water, i.e. water from a water grid or any other water source, into the heating unit. In other words, the first pressure-sensitive valve allows flow of water when the pressure or the flow rate therethrough is relatively low and it switch to a blocking state, therefore blocking flow of water therethrough when the pressure of flowrate therethrough exceeds a certain threshold. It is to be noted that this threshold can be adjusted at any desired value. When the first pressure-sensitive valve is in an open state, no new water flows into the system and the water in the system circulates due to the heating activity of the one or more heating bodies. When the first pressure-sensitive valve is in blocking state, new flow of water enters the system through the main feeding line, typically into the water container, in particular into the bottom part of the water container.

In some embodiments, the system includes a two-directional conduit linking between said two-directional port and a selected level portion of a water reservoir, e.g. a top portion, for allowing two-direction water flow between the top portion of the reservoir and the heating unit.

In some embodiments of the system, the two-directional conduit is linking the heating volume and the top portion.

In some embodiments, the system further includes the water reservoir.

In some embodiments, the system further includes a renewable energy heating unit configured for receiving cold water from a bottom portion of said water reservoir via a conduit, or from a water supply source such as the water grid, and discharge hot water to a top portion of the water reservoir via an additional conduit.

In some embodiments of the system, the renewable energy heating unit is a solar-based heating unit.

In some embodiments, the system further includes a second conduit for linking between said bottom portion of the reservoir and the renewable energy heating unit, and a third conduit for linking between the second conduit and the at least one inlet.

In some embodiments of the system, the top portion of the water reservoir is at least the top third of said water reservoir or the top quarter. In some embodiments, the top portion is defined by a distance from the top end of the reservoir that is in the magnitude of the diameter of the two-directional conduit, i.e. between half of its diameter and two-folds its diameter.

In some embodiments of the system, the water reservoir is disposed at a location higher that the heating unit. In some embodiments, the heating unit is disposed below the top portion of the water container.

In some embodiments, the system further includes one or more following two-directional ports for allowing two-directional flow of water from a respective following heating volume and a top portion of a water reservoir.

In some embodiments, the system further includes one or more following two-directional conduits for allows the two-directional flow of water.

In some embodiments, the water heating system includes a reserve heating body that may be installed within the water container or external to the water container. The reserve heating body is configured to automatically replace the water heating units in case of a malfunction thereof. The system is configured to detect the transfer of activity to the reserve heating body and transmit an alert to the user.

In some embodiments of the water heating system, each heating volume, leading or following, may comprise two or more common heating bodies. The term "common heating bodies" means that these heating bodies are common to the same heating volume.

In some embodiments of the water heating system, the common heating bodies are sequential/arranged in series to one another along the flow path defined by the heating volume.

In some embodiments of the water heating system, the common heating bodies has a certain degree of overlap along the flow path defined by the heating volume. It is to be noted that the degree of the overlap can be of any length up to complete overlap between the two common heating bodies, thus allowing to maintain the heating volume with dimensions of substantially one heating body, at least along one axis.

In some embodiments of the water heating system, each common heating body comprises its independent temperature sensor.

In some embodiments of the water heating system, the common heating bodies are electrically connected in a switchable manner, typically via an array of contactors, between series and parallel connections.

In some embodiments of the water heating system, the common heating bodies are configured to be connected (i) in parallel upon egress of water through the hot-water outlet and (ii) in series when there is no water flow through the hot-water outlet.

In some embodiments, the water heating system comprises a bypass conduit linking the two-directional conduit and a portion of the outlet of the hot water to allow hot water to bypass the heating bodies and be diverted directly to the consumer of the hot water. A bypass temperature-sensitive valve is disposed at the connection junction between the bypass conduit and the two-directional conduit and is configured to divert water towards the heating bodies in case the temperature that is sensed by its associated temperature sensor is below a threshold temperature and divert water toward the outlet of the hot water when the temperature is above said threshold temperature. This reduces hot water flow through the heating bodies and therefore reduces accumulation of scale.

Another aspect of the present disclosure provides a valve configured for regulating or selectively directing flow of liquid. The valve includes an inlet for receiving a feed of water defined by an elongated duct portion having an opening at its distal end. The valve further includes first and second water ports for allowing liquid flow communication therethrough, namely between the valve and an external liquid source or liquid drain. A blocking element of the valve is switchable between a blocking state that blocks water flow through the first port and an open state that allows water flow through the first port. The blocking element is biased to the open state, namely when there is no pressure difference in the valve, the blocking element is in the open state. A cup-shaped element is fitted over the elongated duct portion, or in other words the elongated duct portion fits within the cup-shaped element, such that it maintains a gap between the elongated duct portion and its cup-defining walls for allowing flow of liquid through the gap that is in fluid communication with the two ports. The valve is configured such that (i) when there is no inflow of feed of liquid through the inlet, the valve allows flow of liquid from the first port to the second port or vice versa and the cup-shaped element rests on the opening of the valve and blocks flow of water therethrough; and (ii) upon an inflow of feed of liquid through the inlet is displaceable to an extent that it is pressed against a portion of the blocking element, thus switching its state to blocking state and allowing flow of liquid through the second port.

In some embodiments of the valve, the cup-shaped element is displaceable between a resting position and a maximal displacement position.

In some embodiments of the valve, the elongated duct portion defines an axis and the cup-shaped element displaces along said axis and the cup-defining walls are having a selected length greater than the length defined by the maximal displacement position, therefore, the cup-shaped element maintains over the elongated duct portion.

In some embodiments of the heating water system as described above, at least one of the following pressure-sensitive valve, the first pressure-sensitive valve and the third pressure-sensitive valve is any one of the above-described embodiments of the valve.

Yet another aspect of the present disclosure provides a water heating system. The system comprising a heating unit that comprises (1) a lead water-heating body configured for heating water in a heating volume, (2) at least one inlet for receiving a feed of cold water into said lead heating volume, (3) a hot-water outlet downstream the lead water heating volume for egress of hot water from the heating unit, (4) a first two-directional port for allowing water flow into the heating unit upon egress of water through the hot-water outlet and water flow out of the heating unit towards a water container when there is no water flow through the hot-water outlet, (5) a second two-directional port for allowing flow of water between the bottom portion of the water container and the heating volume when there is no consumption of hot water, and flow of water between the inlet and the bottom portion of the water container when there is a consumption of hot water through the outlet.

In some embodiments, the water heating system further comprising a three-directions pressure-sensitive valve linking the heating volume, second two-directional port and the inlet, and is configured for (i) allowing flow of water between the second port and the heating volume when there is no consumption of hot water and (ii) allowing flow of water between the inlet and the second port when there is consumption of hot water.

In some embodiments, the water heating system further comprising a first two-directional conduit linking the first two-directional port and the top of the water container and a second two-directional conduit linking between the second two-directional port and the bottom of the water container.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A shows a general presentation of the system and FIGS. 1B-1E show different operation modes of the system.

FIG. 8A exemplifies the connection configuration in which the common heating bodies are connected in series and FIG. 8B exemplifies parallel connection.

FIG. 9A shows the valve in a first state and FIG. 9B shows the valve in a second state.

DETAILED DESCRIPTION OF EMBODIMENTS

The following figures are provided to exemplify embodiments and realization of the invention of the present disclosure.

Figure 1A:
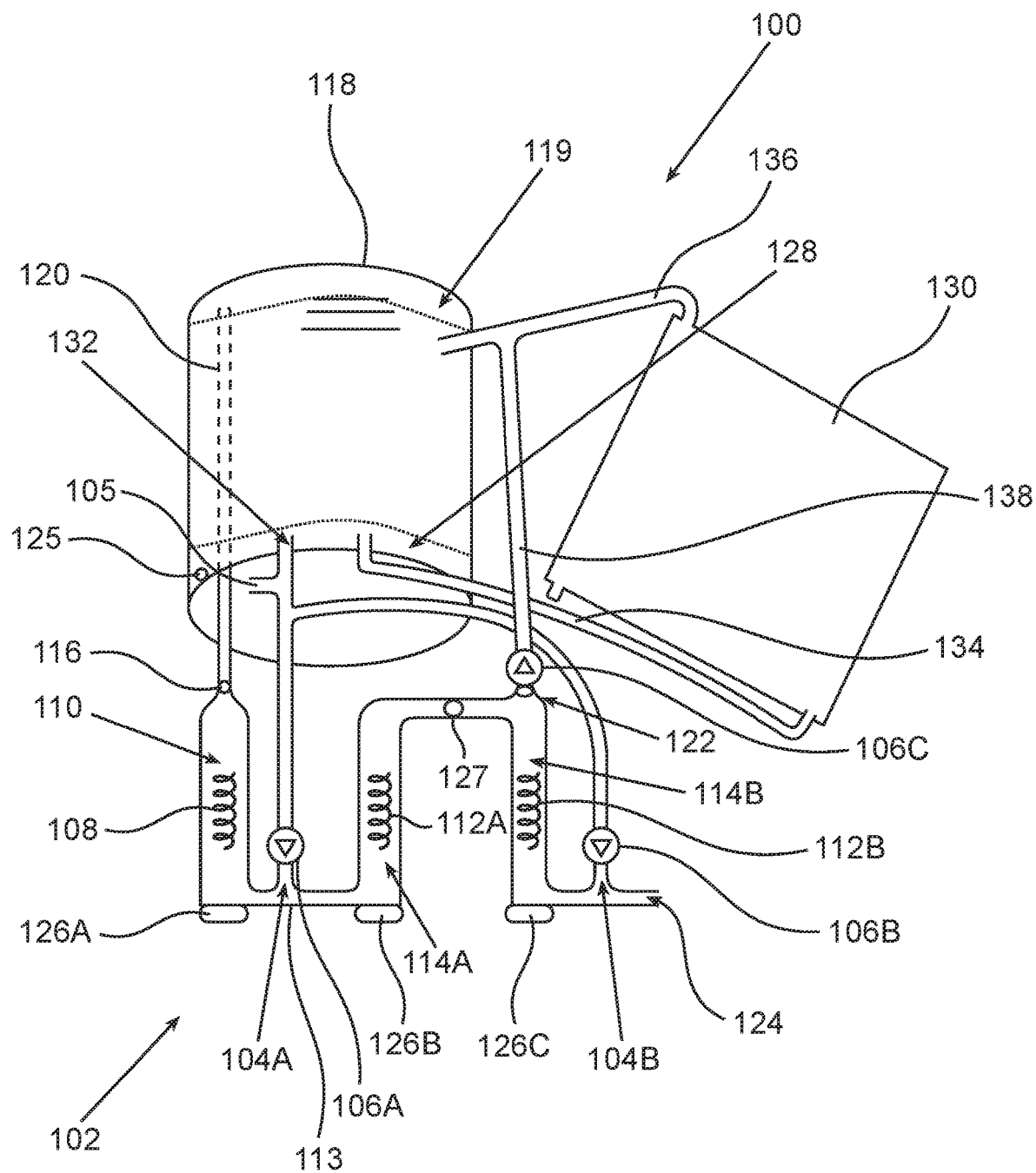
FIGS. 1A-1E are non-limiting examples of schematic illustrations of different embodiments of the system according to the present disclosure.

Reference is first made to FIGS. 1A, which is a schematic illustration of a non-limiting example of an embodiment of the system according to the present disclosure. It should be understood that the system may include less or more components that those presented in FIG. 1A. The system 100 includes a first heating unit 102 operated by electricity power. The first, electric, heating unit 102 includes a first inlet 104A for receiving a flow of fresh cold water from a main water supply source 105, such as main water grid, into the heating unit 102. a first pressure-sensitive valve 106A is disposed between the first inlet 104A and the main water supply source 105 for selectively allowing flow of water into the heating unit 102. The first pressure-sensitive valve 106A is configured to allow flow of water therethrough when the pressure difference of the water that is applied thereon is below a certain threshold. This threshold is determined to distinguish between a state in which there is a consumption of hot water of a consumer from the system, namely a flow of hot water out of the system, and a state in which there is no hot water consumption and the pressure is substantially constant within the system and the heating unit (neglecting pressure difference due to temperature gradient). In some embodiments, the first pressure-sensitive valve 106A constitute the first inlet 104A to the heating unit 102. The heating unit 102 further includes a lead heating body 108 that is in thermal contact with a lead heating volume 110 and is configured to heat water in said lead heating volume 110. A first following heating body 112A is in thermal contact with a first following heating volume 114A and is configured to heat water in said first following heating volume 114A. The heating unit 102 includes a manifold 113 that is configured to split the water flowing through the inlet towards the lead heating volume 110 at one direction and the first following heating volume 114A at another direction. During operation of either the lead heating body 108 and the first following heating body 112A, the water in the lead heating volume 110 or in the first following heating volume 114A are heated by being exposed to thermal heating of the respective heating body.

A two-directional port 116 at the end of the lead heating volume 110 allows two-directional flow between the lead heating volume 110 and a water reservoir 118 that is intended to be filled with and hold hot water. In particular, the lead heating volume 110 is linked to the top portion 119 of the water reservoir 118 to allow hot water being heated in the lead heating volume to circulate to the top portion 119 of the water reservoir 118. A two-directional conduit 120 links between the two-directional port 116 and the top portion of the water reservoir 118.

When referring to a two-directional component in the system, it should be understood that water may flow freely in the component towards two-directions depending on the pressure difference of water in the system and in the component in particular. When there is no substantial pressure difference in the component, the water generally flows in a first direction due to circulation of water of different temperatures, namely hot water flows upwardly, e.g. to fill the water reservoir. When there is a substantial water difference in the component, i.e. a pressure difference that occurs due to consumption of hot water, the water in the component flows towards a second direction to the hot water outlet of the system to fulfill the consumer needs (e.g. hot water for a shower, dish washing or any other household or industrial needs).

A second following heating volume 114B is disposed downstream the first following heating volume 114A and in thermal contact with a respective second following heating body 112B. A second inlet 104B is disposed at the proximity of the second following heating volume 114A to allow water from the water supply source 105 to enter the heating unit 102 and reach directly to the second following heating volume 114B. A second pressure-sensitive valve 106B is disposed between the second inlet 104B and the water supply source 105 to allow flow of water through the inlet when there is no substantial pressure difference in the system.

A third pressure-sensitive valve 106C is disposed at a following port 122 and is configured to selectively allow flow of hot water heated in the first and second following heating volumes 114A and 114B towards the top portion 119 of the water reservoir 118. It is to be noted that the third pressure-sensitive valve is configured with a mechanism that is sensitive to flow of water between the second heating volume 114A and the third heating volume 114B, i.e. the pressure-difference of the water at this flow path, such that the valve is switched to blocking state upon the pressure difference/the flow rate at said flow path exceeds a certain threshold. The heated water circulates towards the top portion when there is no hot water consumption from the system, namely when there is no substantial pressure difference in the system. The following port 122 is disposed between the first and second following heating volume 114A and 114B such that it capable of collecting heated water from both heating volumes.

A hot water outlet 124 is disposed downstream the second following heating volume 114B such that when hot water are consumed by a consumer, water flows from the top portion 119 of the water reservoir 118 through the lead heating volume 110 first, to the first following heating volume 114A, then to the second following heating volume 114B and then through the hot water outlet 124 to reach the consumer.

Each of the heating bodies is associated with a respective temperature sensor that is configured to sense the water temperature in the respective heating volume or upstream the respective heating volume. Each sensor is operatively connected to its respective heating body such that upon sensing a water temperature below a certain desired value when hot water is consumed, namely when water flows in the system towards the hot water outlet, the heating body is activated to heat the water that flows therethrough thereby heating the water during its flow in the heating unit 102 until reaching the desired consumption temperature. Therefore, a first temperature sensor 126A is associated with the lead heating body 108, the second temperature sensor 126B is associated with the first following heating body 112A and the third temperature sensor 126C is associated with the second following heating body 112B. A pressure-sensitive switch has a pressure-sensitive component 127 disposed at any location along the flow path in the system and is configured to control the power supply to heating bodies that are not operated in a non-consumption mode, namely when there is no hot water consumption and the heated water circulates towards the water reservoir, such that when hot water are being consumed and the pressure sensitive component 127 senses a pressure difference above a certain threshold power may be supplied to the non-activated heating bodies depending on the temperature sensed by their respective temperature sensors. For example, when only the lead heating unit is activated and the water heated thereby circulates to the water reservoir and are accumulated therein, upon hot water consumption by a consumer, the pressure-sensitive switch allows power supply to reach the first and second following heating bodies and their activation is controlled by their respective temperature sensors, namely each of them is activated when the sensing of the temperature in their associated temperature sensor is below a predetermined temperature value.

The entire system may be regulated by a thermostat 125 that is disposed at a bottom portion 128 of the water reservoir 118. When the thermostat 125 senses a temperature above a certain temperature threshold it disconnects the power supply to the entire system such that no additional heating is performed by the system. This is to avoid unnecessary heating of the system which can cause safety issues.

Thus, heated water from the heating unit may either flow to a water reservoir to be contained therein and be ready for consumption upon demand or flow towards the hot water outlet after being heated during the flow from the water reservoir. In this unique configuration the water are being heated twice by at least one of the heating bodies, first when they are fed in the heating unit and circulates due to its temperature difference to the top portion of the water reservoir and second when it flows from the top portion of the water reservoir and heated by the at least one heating body in its respective heating volume during its flow towards the hot water outlet.

The heating system 100 may further include a renewable energy heating unit 130, such as a solar heating unit, however it is noted that the water system of the present disclosure may operate without an additional heating system, either renewable-energy based heating system or other heating system. The solar heating unit receives a feeding of water from the bottom portion 128 of the water reservoir 118 through a first conduit 134, the bottom of the reservoir typically contains cold water being fed from the water supply source 105 through a water reservoir inlet 132 disposed at its bottom. The water are being heated in the solar heating unit by solar energy and circulates to the top portion 119 of the water reservoir 118 through a second conduit 136. In some embodiments of the system, the following port 122 is linked by a third conduit 138 to the second conduit 136 to thereby allow the circulation of heated water from the following heating volumes towards the top portion of the water reservoir.

FIGS. 1B-1E exemplify different modes of operation of the system described in FIG. 1A.

Figure 1B:
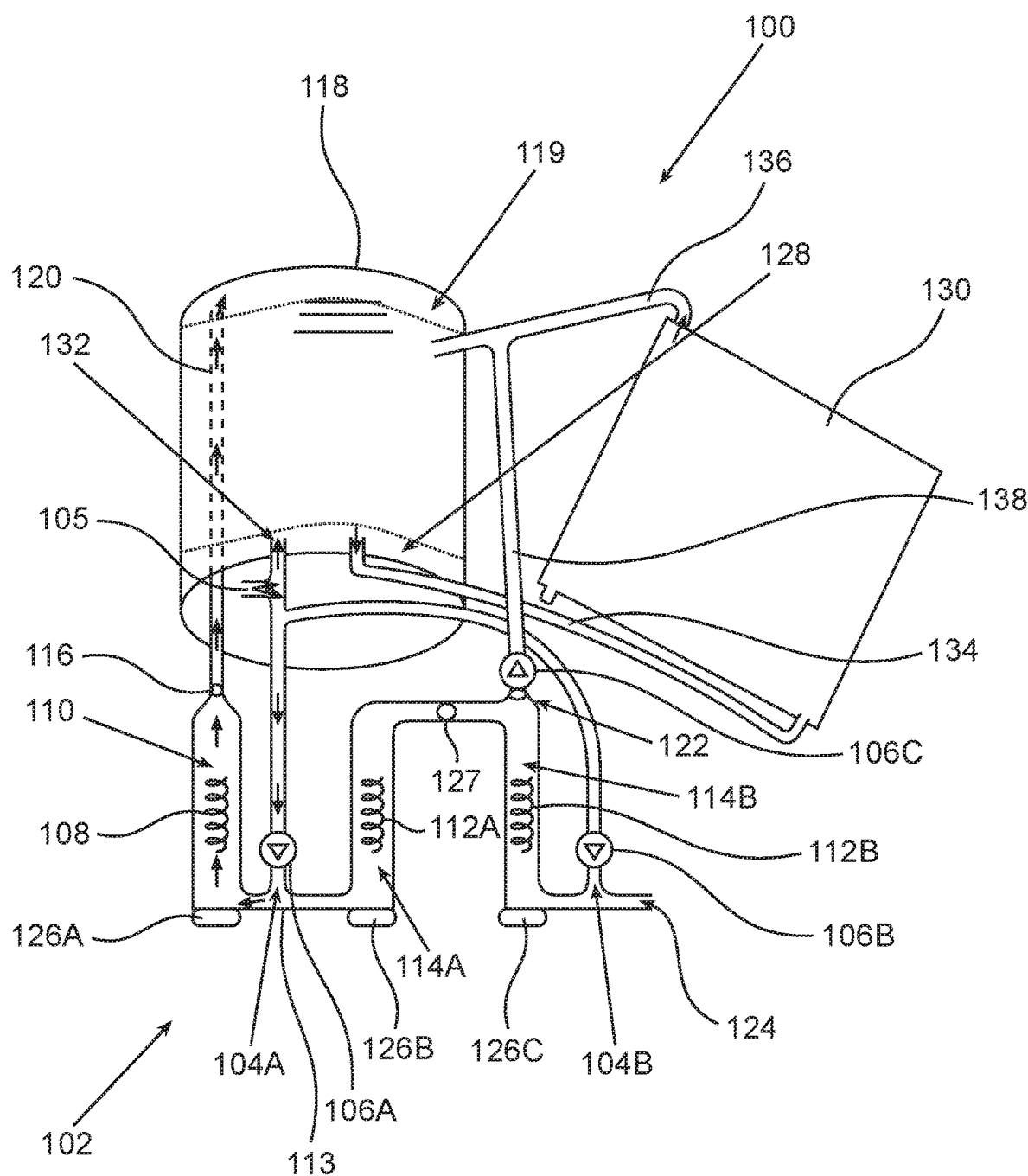

In a first operation mode, exemplified in FIG. 1B, only the lead heating body 108 is activated and the water that are fed from the water supply source 105 are being heated and circulates to the top portion 119 of the water reservoir 118. In this configuration, the water reservoir 118 further receives hot water from a solar heating unit 130. Little arrows indicate the flow direction of the water in the system.

Figure 1C:
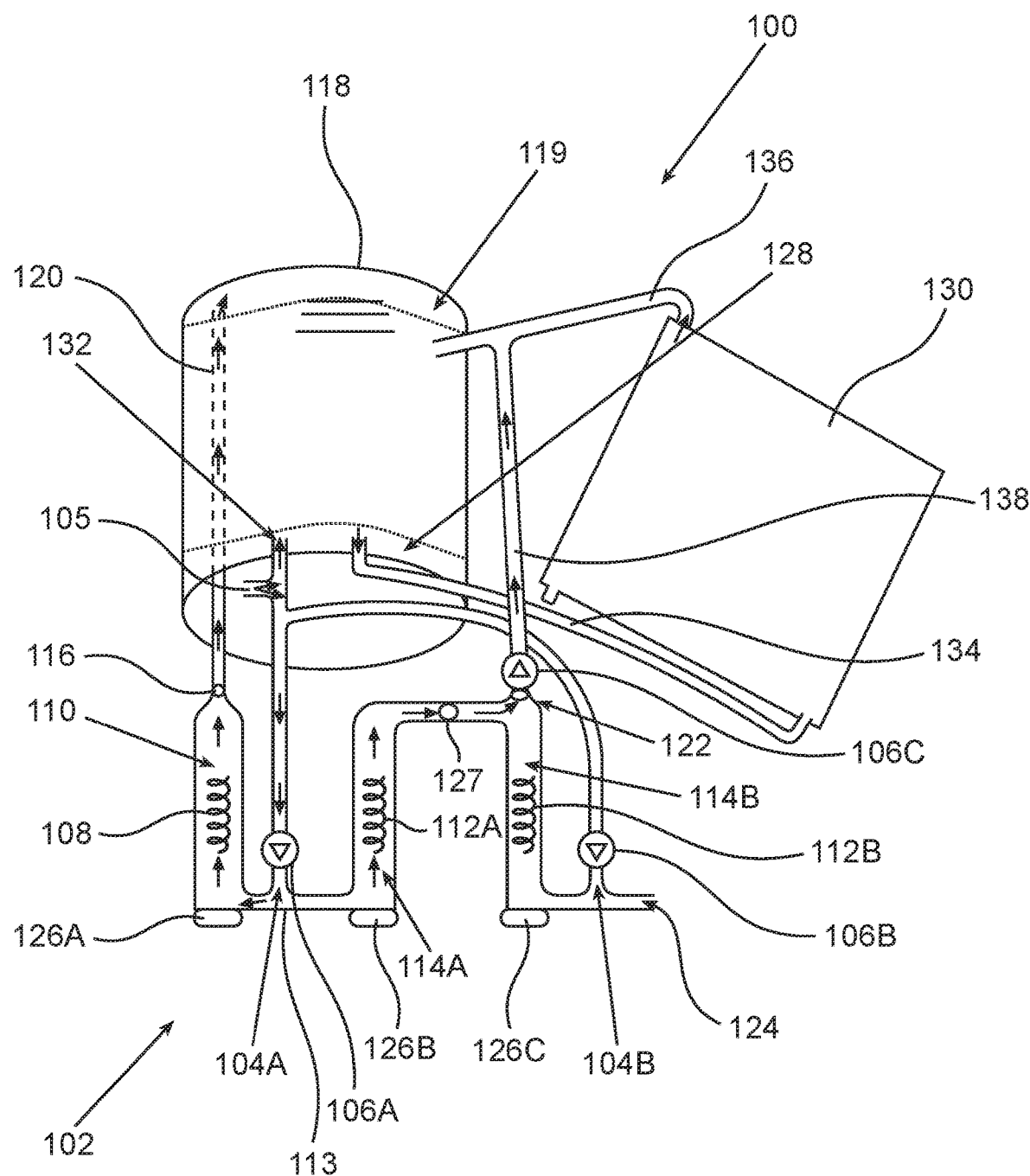

In a second operation mode, exemplified in FIG. 1C, the lead heating body 108 and the first following heating body 112A are activated so as to fill the water reservoir 118 with hot water. The heated water from the two heating bodies circulates to the water reservoir 118 via two different flow paths. The heated water by the lead heating body 108 circulates via the two-directional port 116 and the heated water by the first following heating body 112A circulates via the following port 122 and the third pressure-sensitive valve 106C.

Figure 1D:
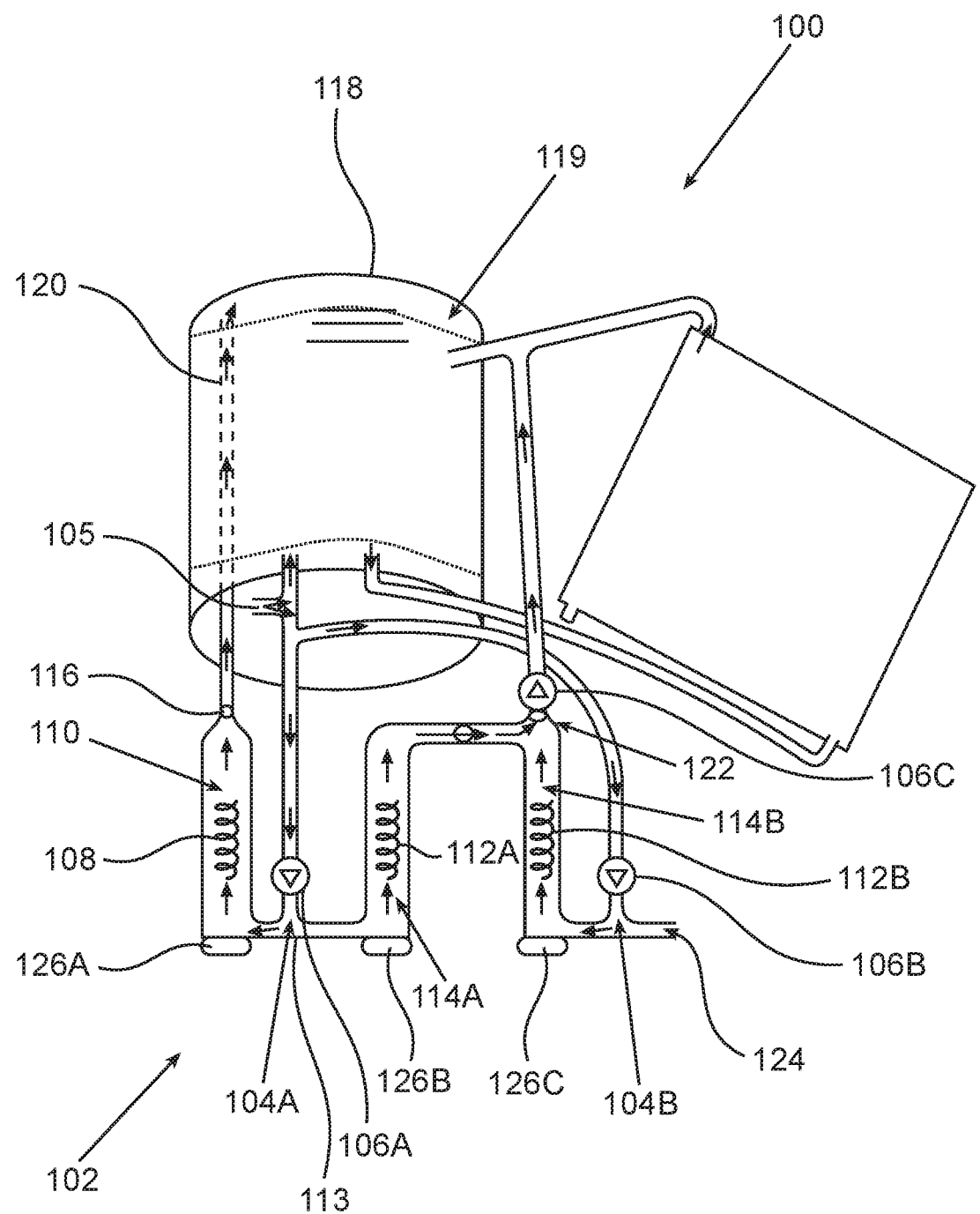

In a third operation mode, exemplified in FIG. 1D, the lead heating body 108, the first following heating body 112A and the second following heating body 112B are activated so as to fill the water reservoir 118 with hot water (the top portion 119 of the water reservoir 118). The heated water by the second following heating body 112B circulates via the following port 122 and the third pressure-sensitive valve 106C that are common to the first following heating body 112A. The following port 122 and the third pressure-sensitive valve 106C are located in the system above the first and second following heating volumes 114A and 114B. Specifically, the following port 122 is located downstream the first following heating volume 114A and linked to the upstream portion of the second following heating volume 114B thereby collecting heated water from both following heating volumes 114A and 114B. By using three heating volumes, the temperature of the water can be controlled in each heating volume to maintain the water under a certain temperature, which reduces the accumulation of limescale. Furthermore, the water temperature in the water reservoir 118 may be controlled by applying selected heating profile on the heating bodies, namely controlling the their activation times and intensities.

Figure 1E:
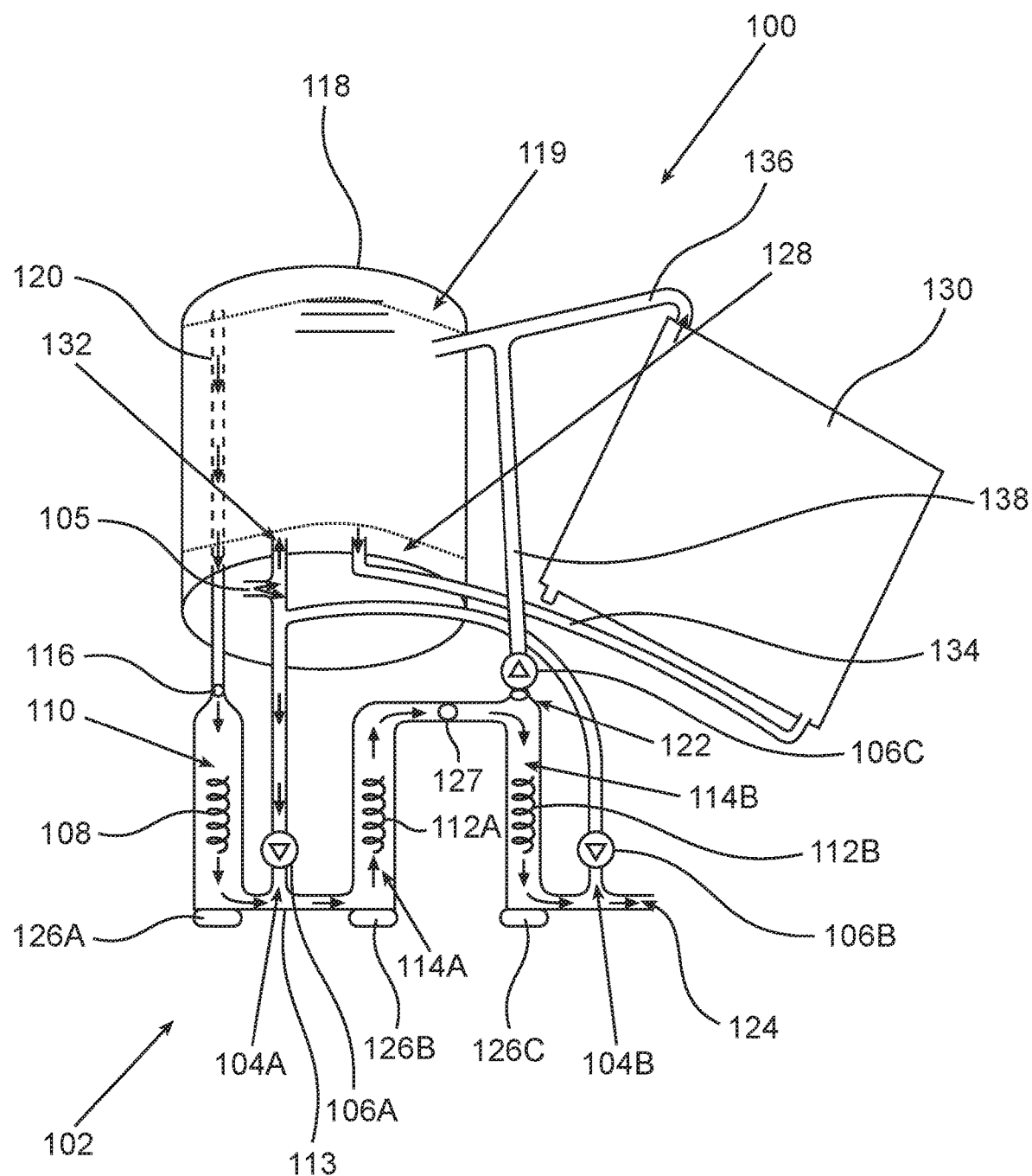

In a third operation mode, exemplified in FIG. 1E, hot water is consumed from the system, causing a flow from the top portion 119 of the water reservoir 118 via the lead heating volume 110, the first following heating volume 114A, the second following heating volume 114B and to the hot water outlet 124 towards the consumer. In this mode of operation, the temperature of the water flows through the heating volumes is sensed in each heating volume by the respective temperature sensor and if the sensed temperature is lower than a selected temperature threshold, the respective heating body is activated to heat the water. If the temperature of the water is sufficiently hot, none of the heating bodies are being activated during the consumption of the hot water. In this mode of operation, the pressure sensitive component 127 of the switch permits power to reach the heating bodies that are in non-activated mode prior to the consumption of the hot water. All the pressure-sensitive valves in the system are in a blocking state in this mode of operation.

In the figures throughout the application, like elements of different figures were given similar reference numerals shifted by the number of hundreds corresponding to the number of the respective figure. For example, element 202 in FIG. 2 serves the same function as element 102 in FIGS. 1A-1E.

Figure 5A:
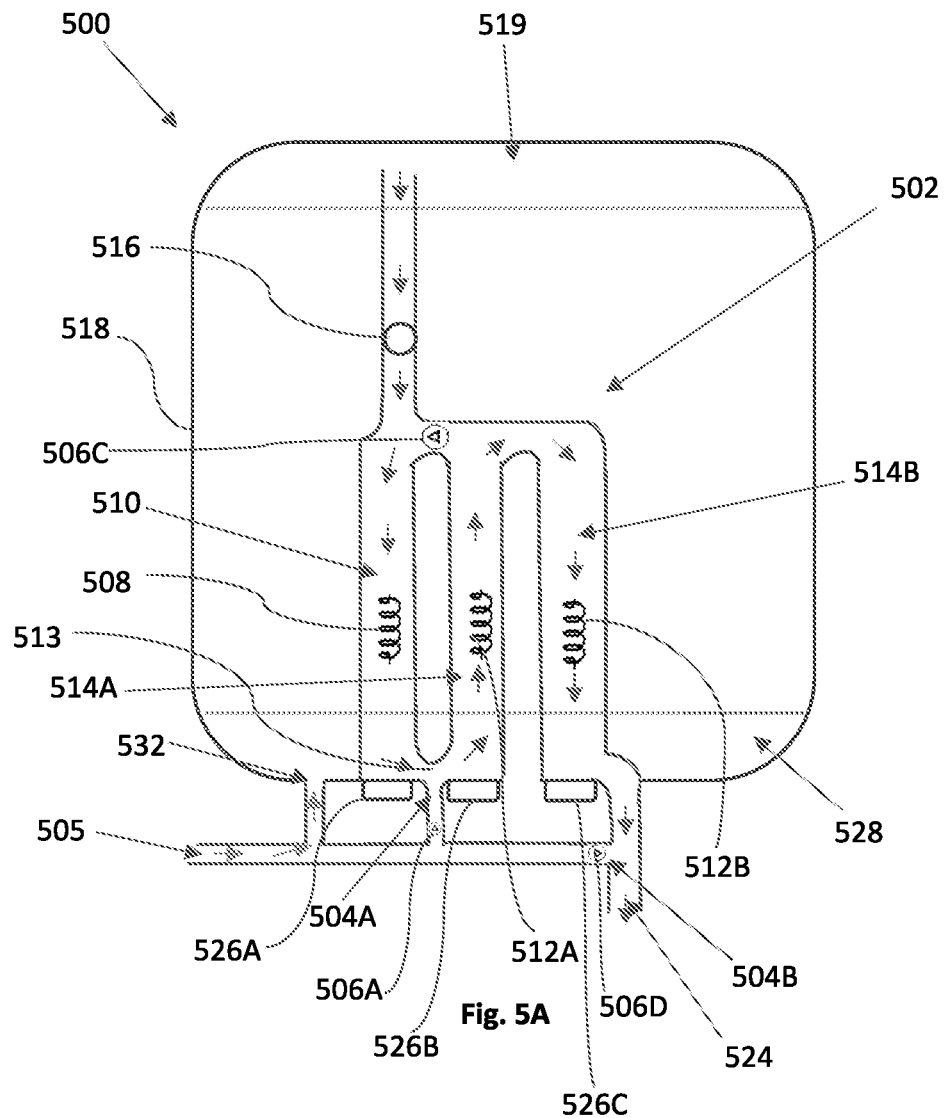
FIGS. 5A-5B are schematic illustrations of a non-limiting example of an embodiment of the water heating system of the present disclosure.
Figure 5B:
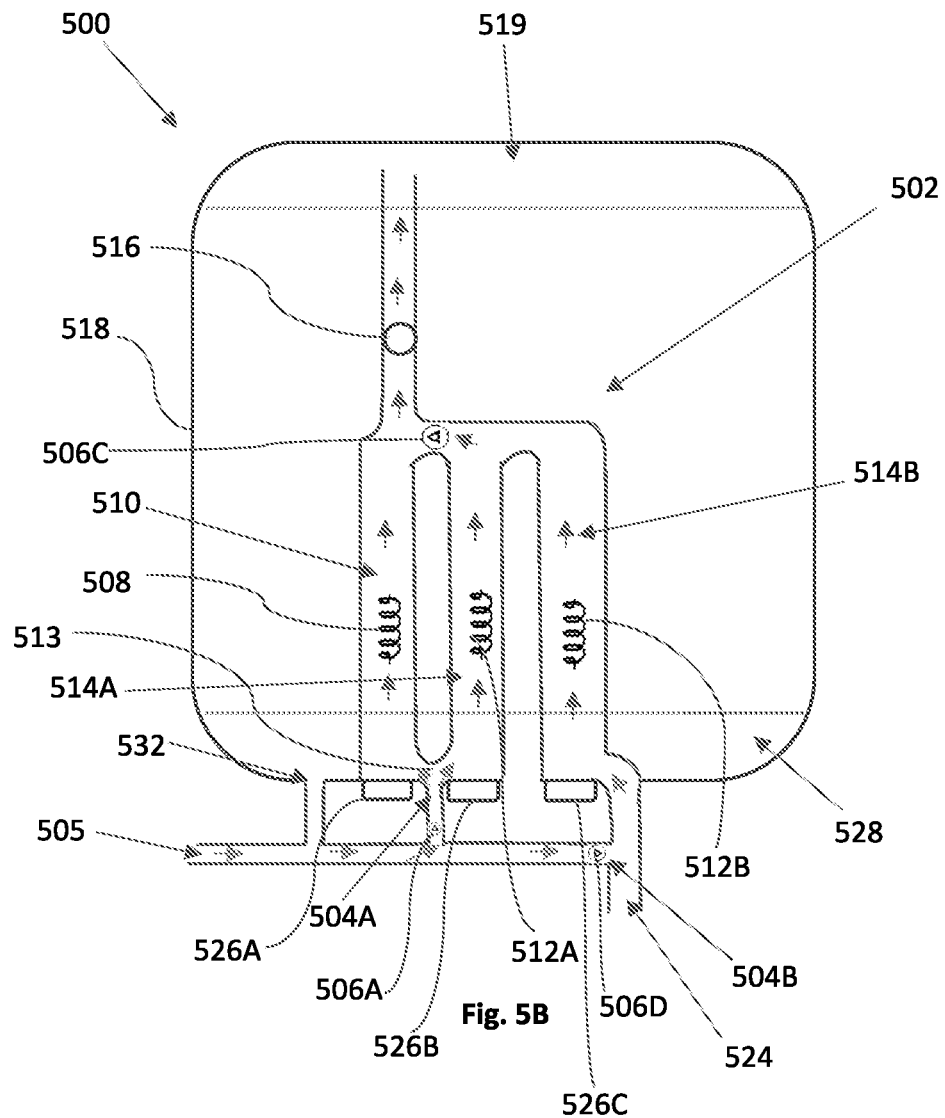

FIGS. 5A-5B are schematic illustrations of a non-limiting example of an embodiment of the water heating system of the present disclosure. In this embodiment, the heating unit 502 is installed within the water reservoir 518 such that all the heating bodies and heating volumes of the heating unit are disposed within the volume of the water reservoir. A first pressure sensitive valve 506A is disposed upstream the water inlet 504A of the heating unit 502 to control the fresh water feeding from the main water supply 505 into the heating unit 502. When there is no water consumption by a user, as exemplified in FIG. 5B and there is no substantial pressure difference in the system the valve is open to allow feeding of cold water into the heating unit 502 through the inlet 504A and to the manifold 513 that diverts the water to the lead heating volume 510 or the first following heating volume 514A.

The water are being heated by any heating body that is activated and circulates via the two directional port 516 towards the top portion 519 of the water reservoir 518 to be stored therein. If the second heating body 512B is activated, fresh water is fed through the second water inlet 504B, via a fourth pressure sensitive valve 506D disposed upstream the second water outlet 504B, to reach the second following heating volume 514B, being heated thereby and circulates through a third pressure sensitive valve 506C towards the top portion 519 of the water reservoir 518. It is to be noted that the number of activated heating bodies in the mode that is exemplified in FIG. 5B is controlled either by the user or automatically in response to temperature sensing by one or more thermostats that are disposed at different levels of the water reservoir and/or by temperature sensing of the fresh feed of water from the main water supply source. When there is consumption of hot water from the system and the pressure difference in the system is above a certain threshold, as exemplified in FIG. 5A, the pressure sensitive valves are switched to blocking state and water from the top portion 519 of the water reservoir 518 flows through the two directional port 516 and flow in a flow path that passes through all heating bodies in series and then discharged through the water outlet 524. Similar to the embodiments of FIG. 1A-1E, each heating volume is associated with a respective temperature sensor to regulate the operation of the respective heating body as explained above.

Figure 2:
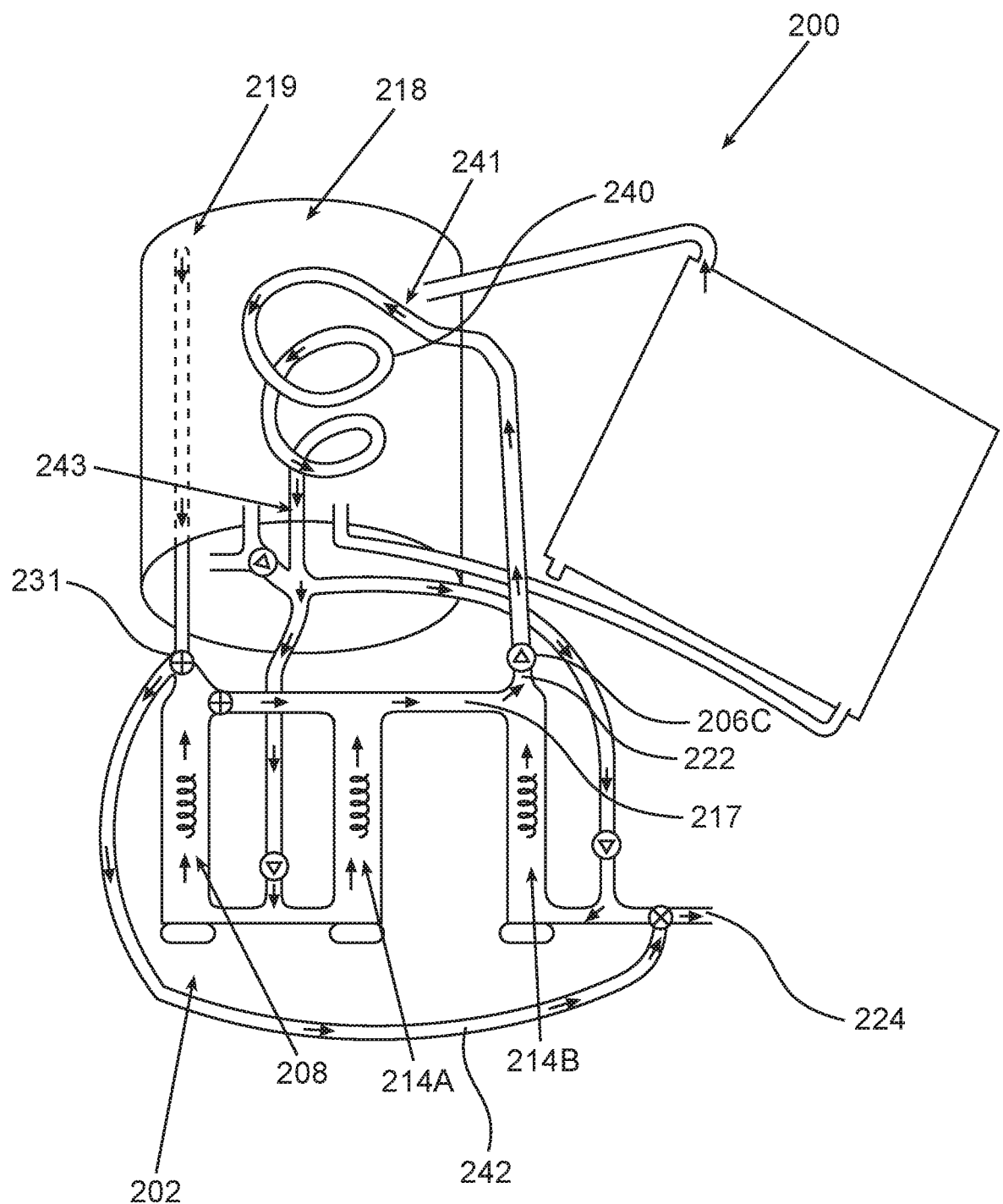
FIG. 2 is a non-limiting example of an embodiment of the system of the present disclosure.

FIG. 2 is a schematic illustration of a non-limiting example of an embodiment of the system of the present disclosure. In this embodiment, the three heating volumes, the lead heating volume 208 and the first and second following heating volumes 214A and 214B, are linked to one another in their top end by a channeling element 217 that is configured to channel the heated water from each heating volume towards the following port 222 and through the third pressure-sensitive valve 206C for flowing into a first, top end 241 of a heat exchanging element 240 that is disposed in the water reservoir 218 and configured to allow the exchange of heat between hot water that flows therein and the water of the water reservoir 218 that surrounds it. It is to be noted that the third pressure-sensitive valve is configured with a mechanism that is sensitive to flow of water between the second heating volume 214A and the third heating volume 214B, i.e. the pressure-difference of the water at this flow path, such that the valve is switched to blocking state upon the pressure difference/the flow rate at said flow path exceeds a certain threshold. The feed of fresh cold water to the three heating volumes is received from a second, bottom end 243 of the heat exchanging element 240 after flowing through the entire heat exchanging element 240 and transferring its heat to the water in the water reservoir 218. The feed of water flows through two inlets, a first feeds the lead heating volume and the first following heating volume and a second feeds the second following heating volume. Therefore, the water being heated by the heating unit 202 flows in a closed loop, heated by the heating bodies and transferring the heat to the water in the water reservoir 218. Upon a demand of water by a consumer, water from the top portion 219 of the water reservoir 218 flows through a bypass conduit 242 towards the hot water outlet 224.

The system that is exemplified in FIG. 2 may operate in a different mode. In case the water in the water reservoir 218 are not sufficiently hot according to a temperature sensing of thermostat within the water reservoir, the water from the water reservoir 218 are directed by a controlled valve 231 to flow into the heating unit 202 through a flow path that includes any of the heating volumes to thereby being heated by one or more of the heating bodies. Each heating body is activate to heat the water in response to the temperature sensing of the water in its respective temperature sensor.

Figure 3A:
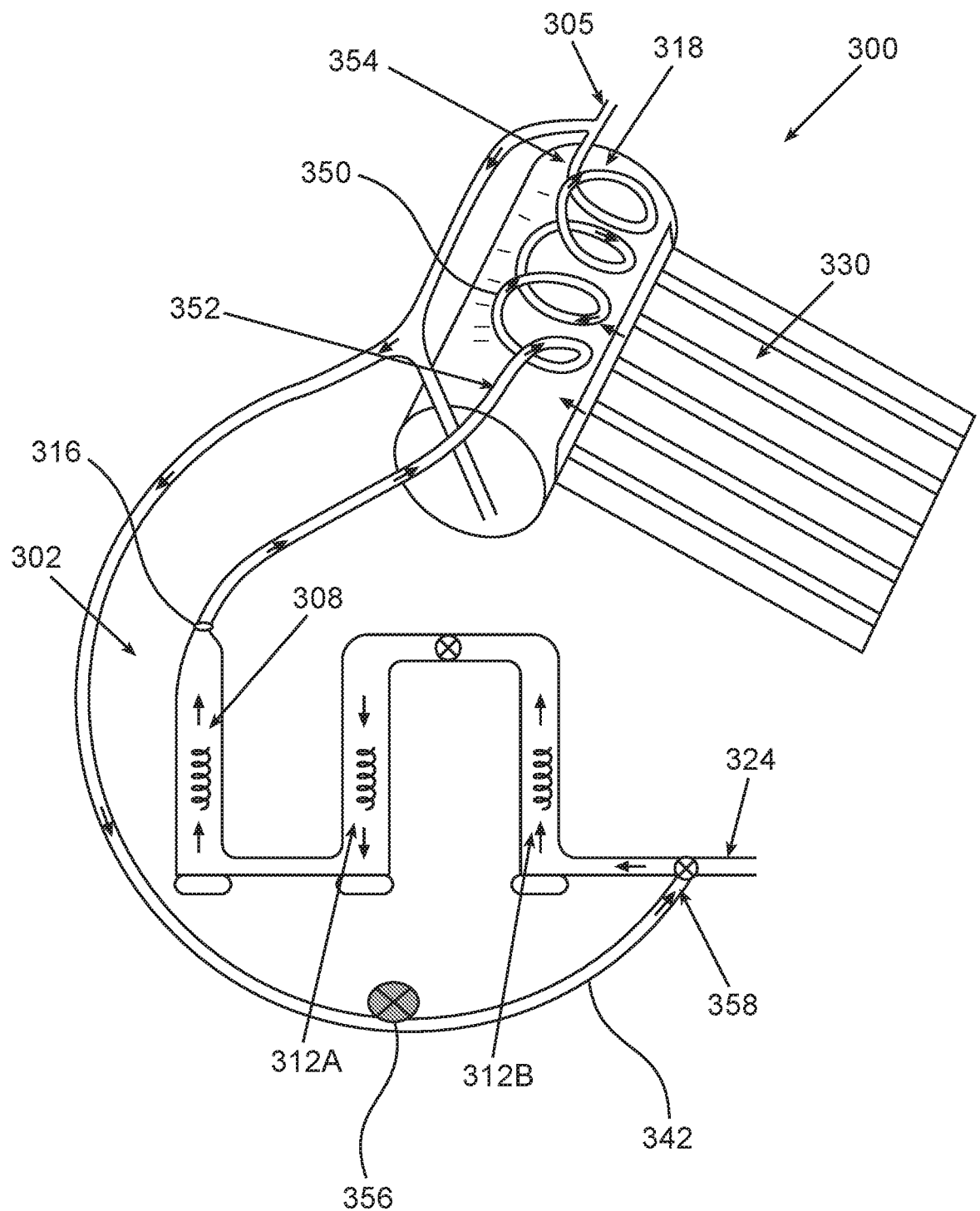
FIGS. 3A-3B are illustrations of another non-limiting example of an embodiment of the system of the present disclosure.
Figure 3B:
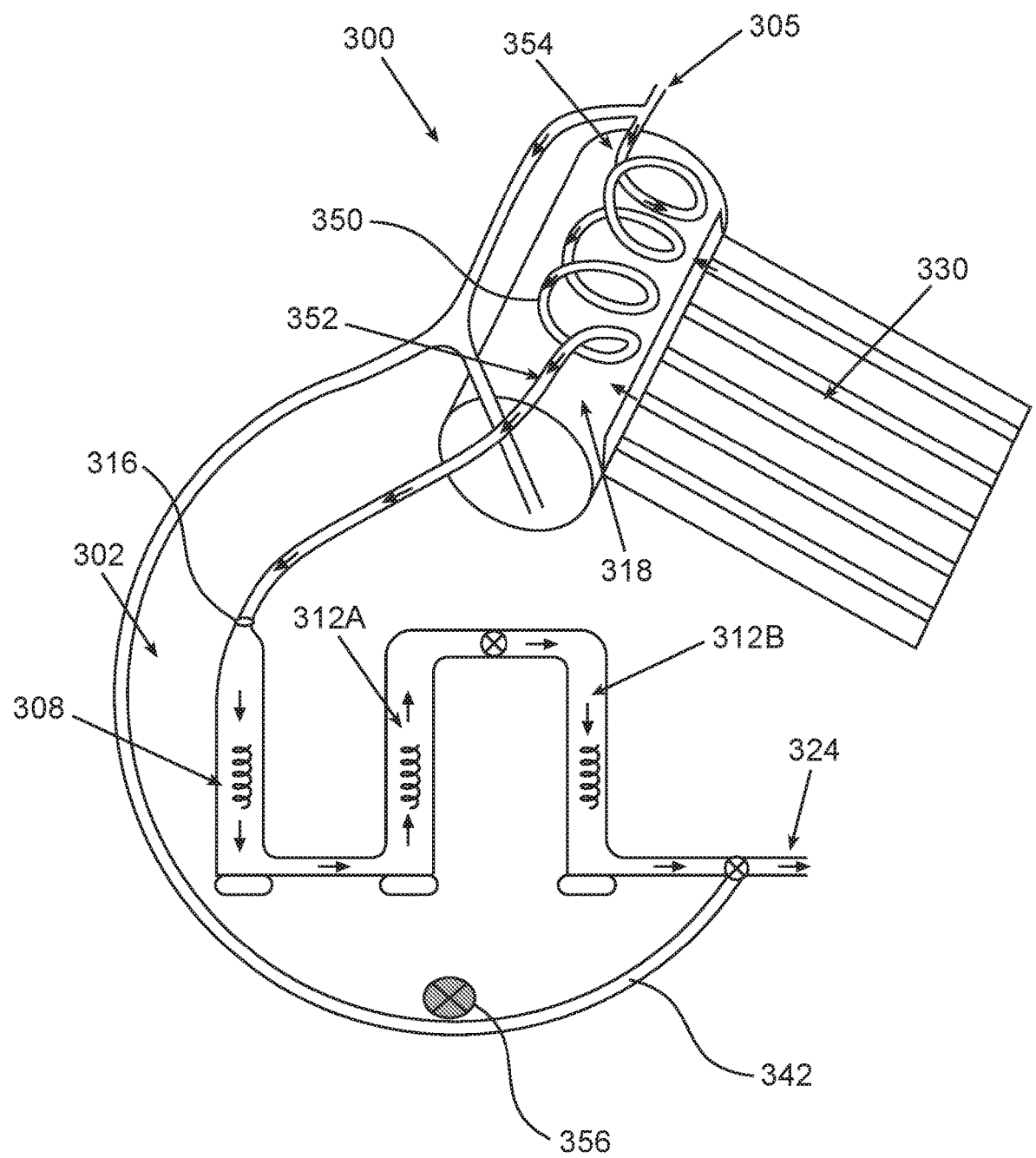

FIGS. 3A-3B are illustrations of another non-limiting example of an embodiment of the system of the present disclosure. In this example, the water being heated in the heating volumes 308, 312A and 312B circulates via two-directional port 316 towards a heat exchanger 350 disposed within a water reservoir 318 that is configured to exchange heat with liquid in the reservoir. In this example, the liquid in the reservoir is trapped and serves only for heat exchanging. The heat exchanger 350 is shaped to have a large surface area with the liquid in the water reservoir 318 to provide relatively large thermal connection therebetween. In this example, the heat exchanger 350 has a spiral shape in the water reservoir 318. The hot water flows through the heat exchanger 350 exchange their heat with the liquid to thereby store heat within the water reservoir 318. The hot water from the heating volumes of the heating unit flows from a top end 352 (the water reservoir in the figure lies in a horizontal orientation) of the heat exchanger 350 to a bottom end 354 thereof and upon reaching the bottom end, a portion of their heat is exchanged with the liquid within the water reservoir 318. Thus, the temperature of the water that are discharged from the bottom end 354 of the heat exchanger 350 are lower than their temperature at their entrance to the top end 352 of the heat exchanger 350. A circulation pump 356 drives the water from the bottom end 354 towards an inlet 358 of the heating unit 302, via a bypass conduit 342, and then the water continuous to flow through all the heating volumes 308, 312A and 312B of the heating unit 302 and heated by any of the activated heating bodies as exemplified in FIG. 3A. This type of flow occurs when there is no hot water consumption by a consumer, namely no hot water is discharged through the hot water outlet 324. Typically, the flow of water in this configuration is in a closed loop when there is no hot water consumption, namely there is no introduction of fresh cold water to the system nor discharge of water from the system.

FIG. 3B exemplifies the flow when there is hot water consumption by a user. In this example, the water flows from the heat exchanger 350 towards the heating unit 302 through the two-directional port 316 and flows through all the heating volumes 308, 312A and 312B of the heating unit 302 and heated by any of the activated heating bodies until the water is discharged towards the consumer through the hot water outlet 324. New fresh water are introduced to the bottom end 354 of the heat exchanger 350 from the water supply source 305 and while they flow through the heat exchanger 350 they exchange heat with the liquid in the water reservoir 318 and heated thereby such that its temperature increases during their flow in the heat exchanger 350.

In this configuration a solar heating unit 330 is configured to heat the liquid in the reservoir to thereby increase the stored heat therein.

Figure 4A:
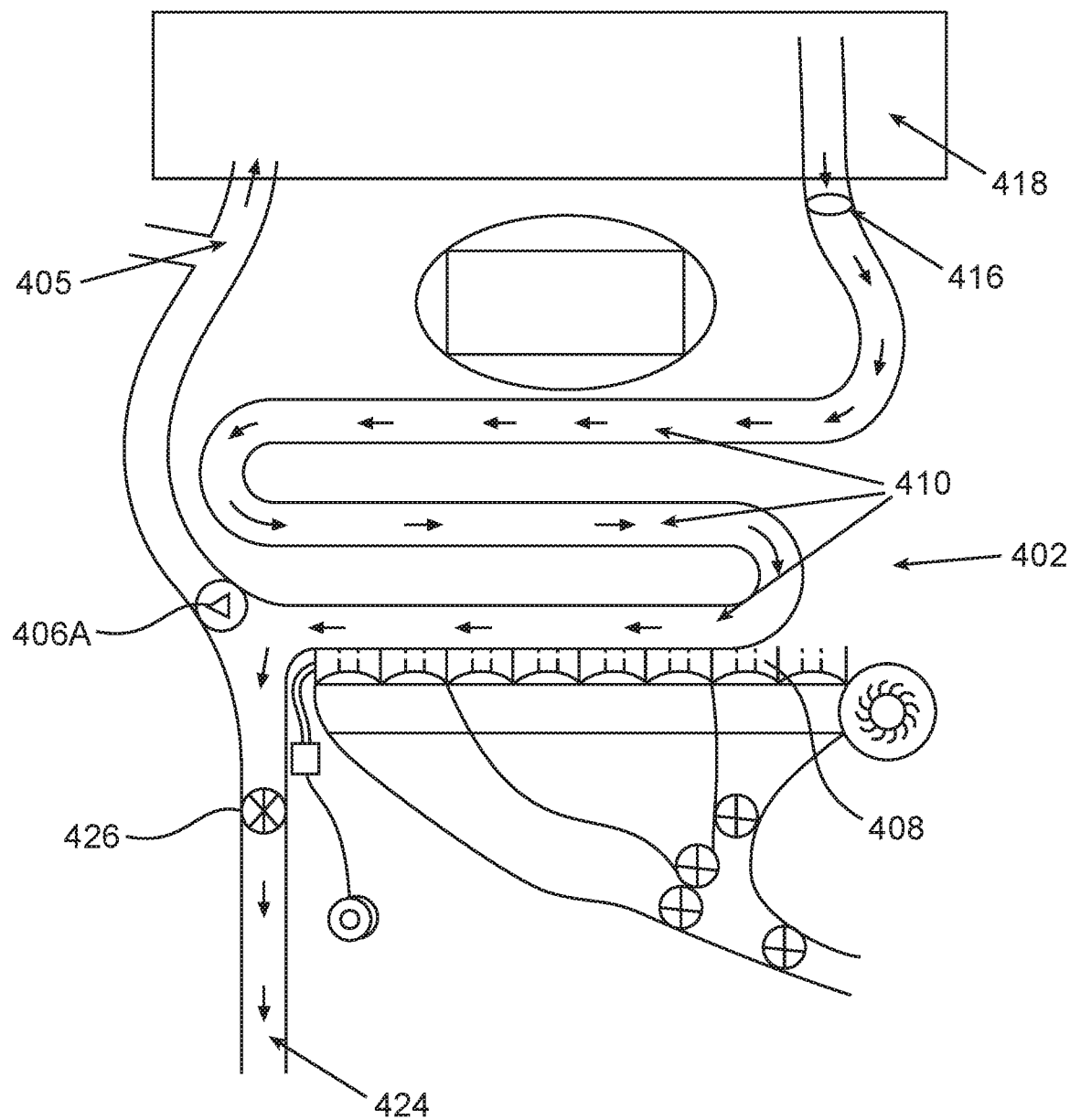
FIGS. 4A-4B are non-limiting examples of schematic illustrations of different embodiments of the system according to the present disclosure in which the heating unit is gas-based heating unit.
Figure 4B:
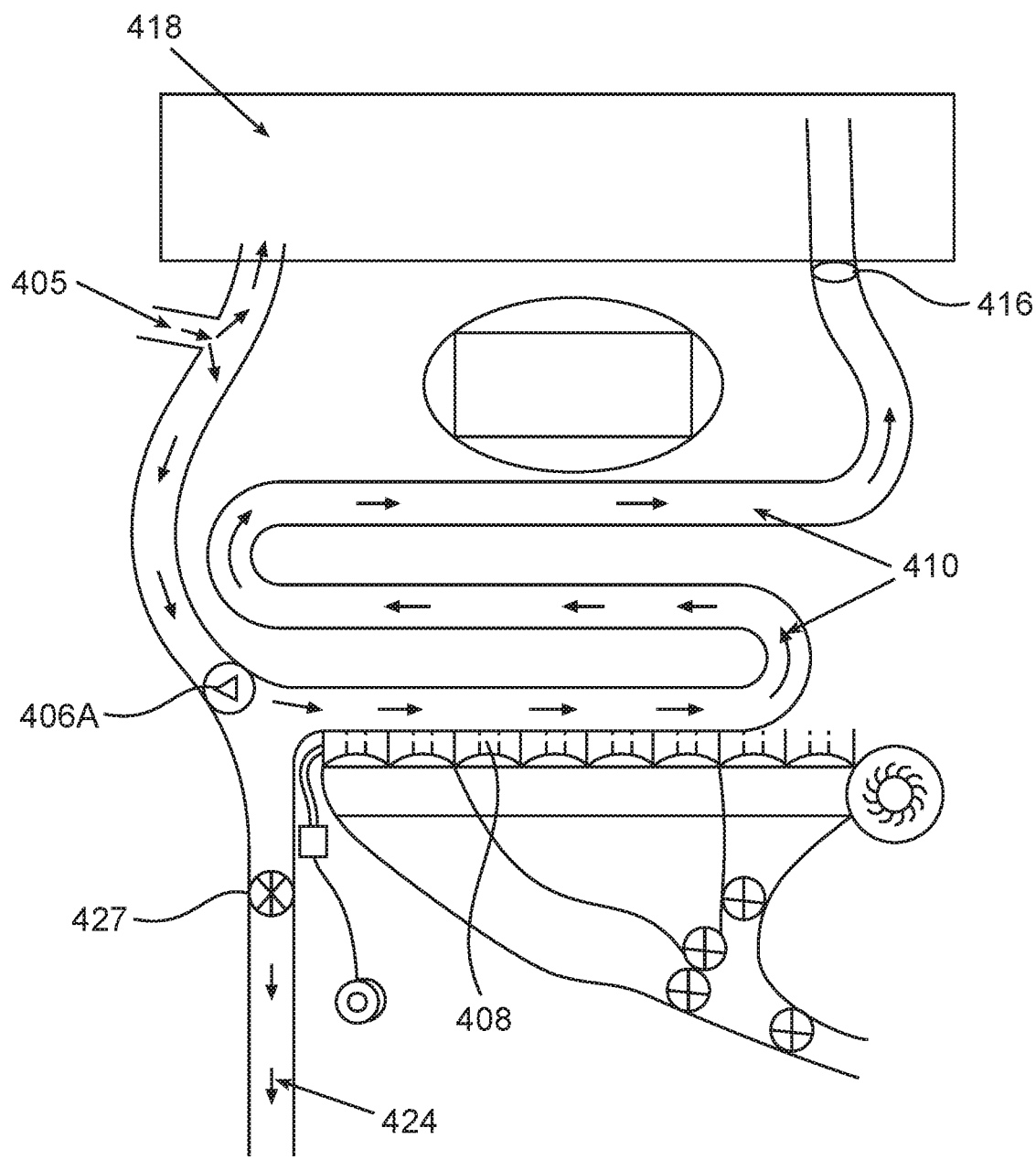

FIGS. 4A-4B exemplify a non-limiting example of an embodiment of the system of the present disclosure utilizing a gas heating system as a first heating unit. FIG. 4A shows the system in a first state, in which hot water is consumed by a consumer and outflows through the hot water outlet 424. The water flows from the water reservoir 418 through the two-directional port 416 towards the heating unit 402 and then to the hot water outlet 424. In this example, the heating unit 402 includes only a lead heating body 408 and a respective lead heating volume 410. However, it is noted that in some embodiments, there may be a plurality of heating bodies and respective heating volumes.

FIG. 4B shows a second state of the system, in which there is no consumption of hot water from the system and the water pressure in the system is substantially equal. Fresh water is fed to the heating unit from the water supply source 405 and flows through the first pressure-sensitive valve 406A towards the lead heating volume 410, being heated therein and circulates via the two-directional port 416 towards the water reservoir 418. It is to be noted that a circulation pump can be installed in the system to propel the cold water coming from the water container towards the heating volume and back to the water container.

Figure 6:
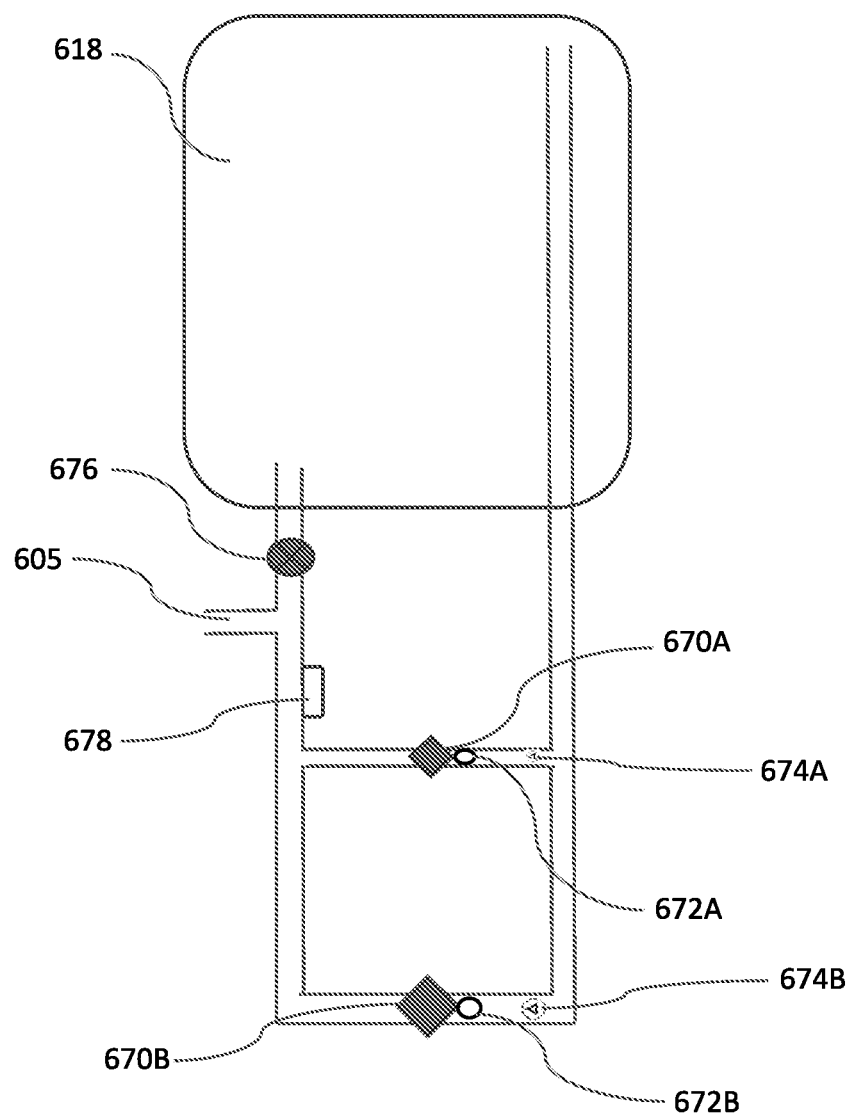
FIG. 6 is a schematic illustration of a non-limiting example of a configuration of additional part of the system that is configured to reduce unnecessary use of water by the consumer.

FIG. 6 is a schematic illustration of a non-limiting configuration of the system of the present disclosure. This figure exemplifies another optional part of the system that is configured to prevent unnecessary consumption of cold water. The figure does not show an illustration of the system as described above, but it should be noted that the part of the system that is shown in the figure may be combined with any of the above embodiments of the system that are described with respect to other figures.

The figure shows a main water supply 605 that provides a feed of cold water that is directed to the water reservoir 618 and to water consuming units 670A and 670B for consuming cold water. The water consuming units 670A and 670B are also fed with hot water from the water reservoir 618, the water to each consuming unit passes through a respective unidirectional valve 674A and 674B. Each water consuming unit 670A and 670B is associated with a respective pressure-sensitive device 672A and 672B that is configured to activate a circulation pump 676 in response to sensing a pressure difference for circulating water that flows towards the respective consuming unit back into the water reservoir. The circulation pump 676 is associated with a temperature sensor 678 that is placed so as to sense water between the consuming units and the bottom, cold water inlet, of the reservoir 618, and is configured to disactivate the circulation pump 676 upon sensing water temperature above a certain threshold. In this configuration, as long as not sufficiently hot water flows towards the consuming units, the water circulates back to the water reservoir and there is no waste of water.

Figure 7A:
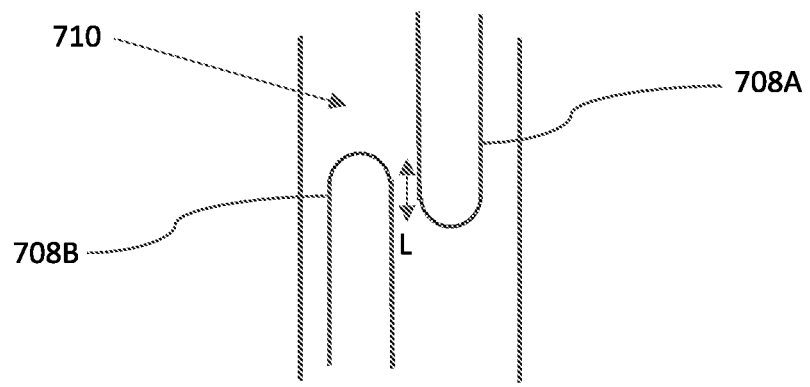
FIGS. 7A-7B are schematic illustrations of non-limiting examples of longitudinal cross-sectional views of examples of optional heating volumes in the water heating system of the present disclosure that includes two (or more) common heating bodies.
Figure 7B:
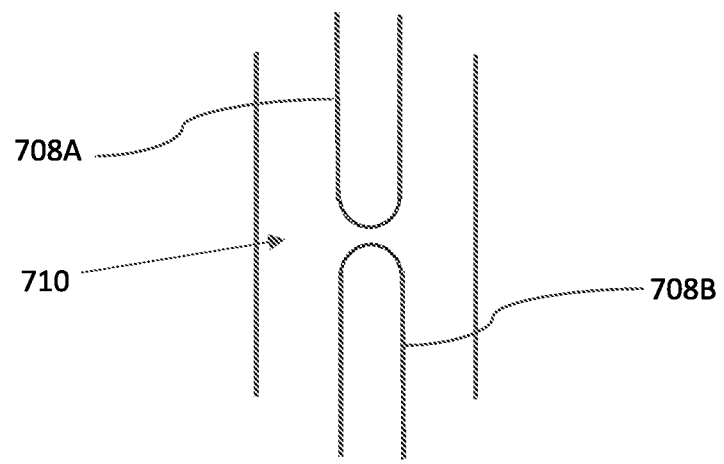

Reference is being made to FIGS. 7A-7B, which are schematic illustrations of non-limiting examples of longitudinal cross-sectional views of examples of optional heating volumes in the water heating system of the present disclosure that includes two (or more) common heating bodies. It is to be noted that these options can be applied in any of the above-described embodiments. FIG. 7A shows a heating volume 710 with two common heating bodies 708A and 708B arranged such that they have a certain degree of overlap, namely a length L of overlap along the flow path that is defined in the heating volume. The degree of the overlap can be of any length up to complete overlap between the two common heating bodies. FIG. 7B shows a heating volume 710 with two common heating bodies 708A and 708B arranged in a series or sequential manner along the flow path defined in the heating volume 710.

Heating with two common heating bodies in a single heating volume may cause accumulation of scale, in particular when there is no consumption of hot water and the system operates in a mode of accumulation of hot water in the water container. Thus, switching between electrical connection modes, namely series connection and parallel connection, between the common heating bodies may reduce the phenomena of accumulation of scale in the heating volume.

Figure 8A:
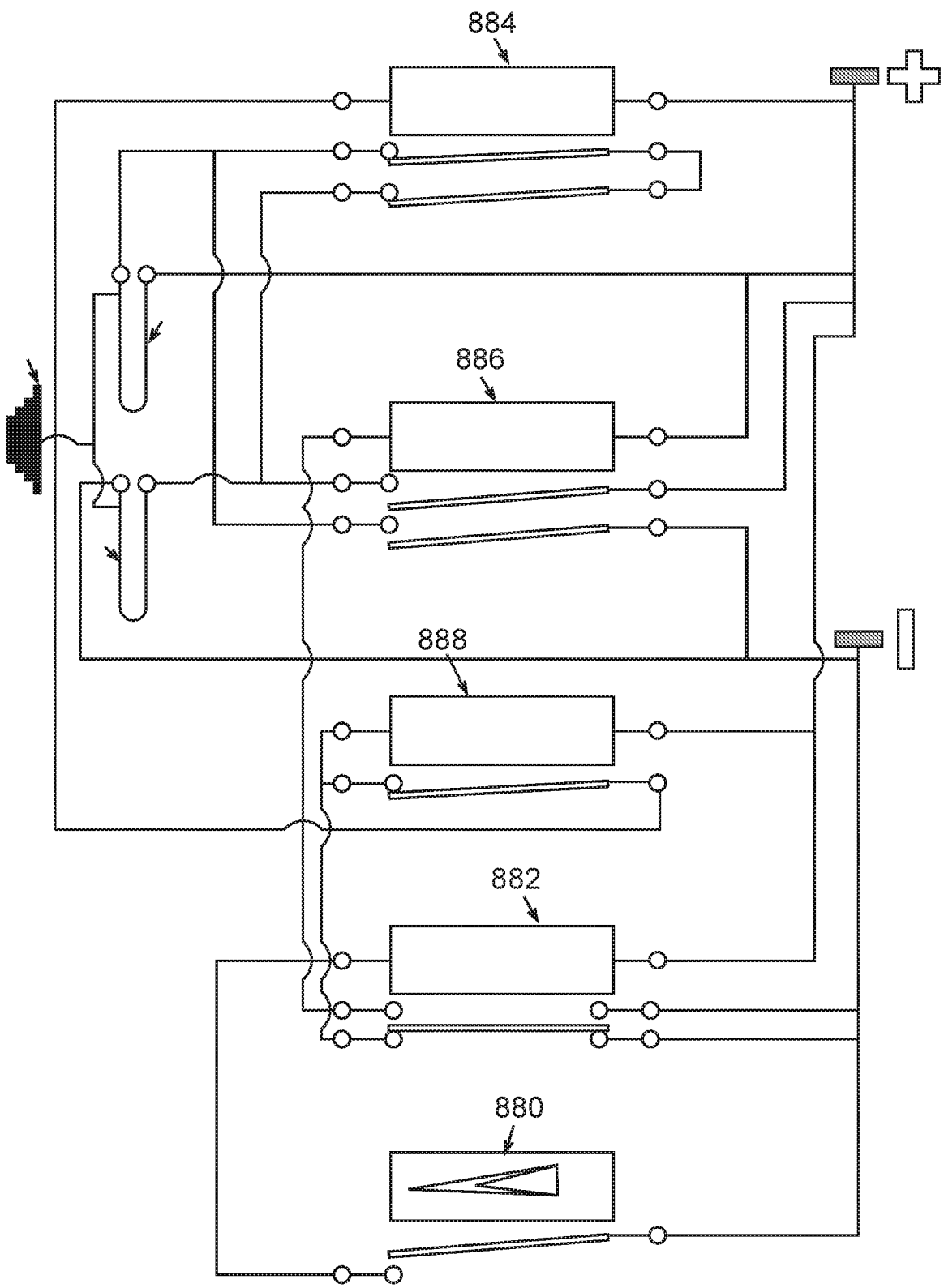
FIGS. 8A-8B are schematic illustrations of connection method that is configured to automatically switch the electrical connection of the common heating bodies between series and parallel connections.
Figure 8B:
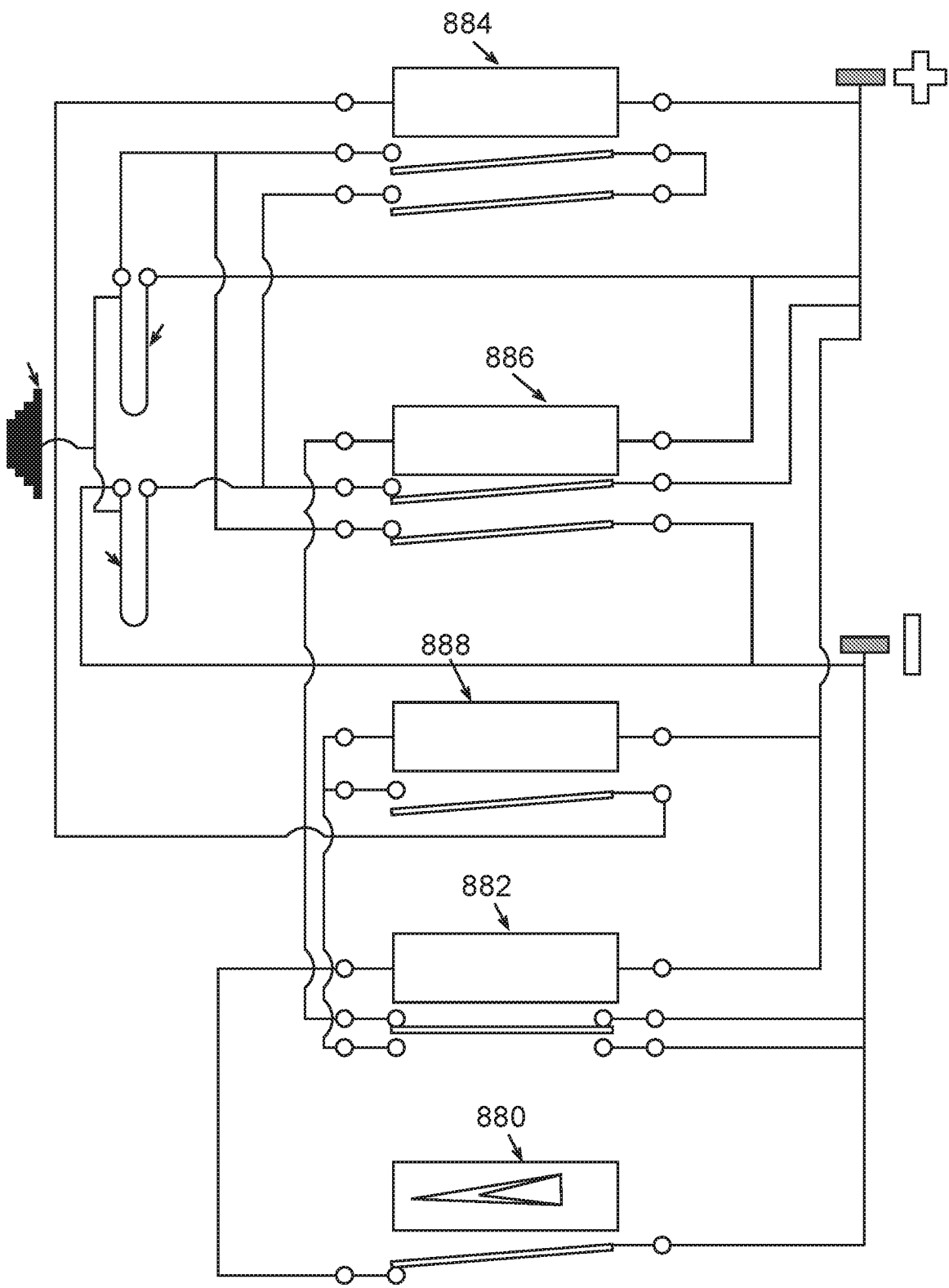

FIGS. 8A-8B are schematic illustrations of connection method that is configured to automatically switch the electrical connection of the common heating bodies between series and parallel connections. FIG. 8A exemplifies the connection configuration in which the common heating bodies are connected in series and FIG. 8B exemplifies parallel connection. A pressure sensitive switch 880 is configured to open the circuit when there is no consumption of hot water, as exemplified in FIG. 8A and to close the circuit when there is consumption of hot water, as exemplified in FIG. 8B. The state of the circuit associated with the pressure sensitive switch 880 affects the selection contactor 882 state. A first state of the selection contactor 882, as exemplified in FIG. 8A affects such that the first contactor 884 is closed and the second contactor 886 is opened and the common heating bodies 808A and 808B are connected in series, thus the heating effect of the heating bodies is reduced and extreme hot temperatures are avoided, therefore avoiding conditions for accumulation of scale. A second state of the selection contactor 882, as exemplified in FIG. 8B, affects such that the first contactor 884 is opened and the second contactor 886 is closed and the common heating bodies 808A and 808B are connected in parallel, thus applying maximum heating effect when water flows therethrough towards the consumer. A third contactor 888 is configured to apply a small delay during the transition between connection states to avoid short circuit.

Figure 9A:
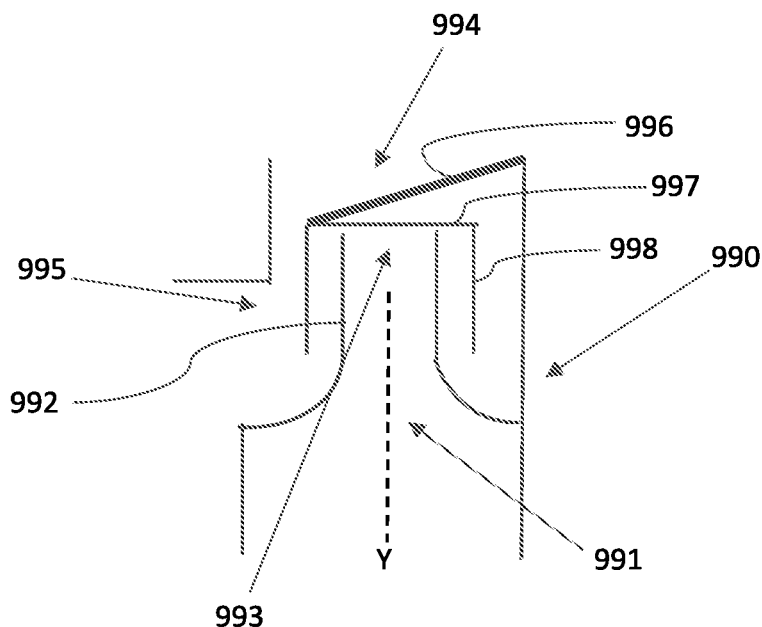
FIGS. 9A-9B are schematic illustrations of a longitudinal cross-sectional view of a non-limiting example of a valve according to an aspect of the present disclosure.
Figure 9B:
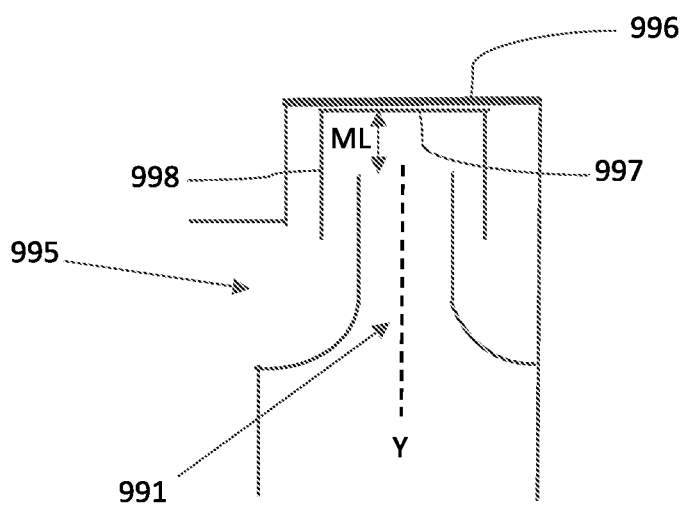

Reference is now being made to FIGS. 9A-9B, which are schematic illustrations of longitudinal cross-sections of a non-limiting example of different states of a valve according to an aspect of the present disclosure. The valve 990 includes an inlet 991 that is defined by an elongated duct portion 992 having an opening 993 in its distal end. The valve includes first and second water ports 994 and 995 that allows flow communication, namely flow of liquid such as water into and out of the valve, between the valve and water sources and/or water drains it is linked to. A blocking element 996 is switchable between a blocking state, in which it blocks flow of water through the first port 994 and an open state, in which it allows flow of water through the first port 994. The blocking element 996 is biased to the open state, namely when there is no substantial pressure difference in the valve it is biased to the open state. A cup-shaped element 997 having cup-defining walls 998 is fitted over the elongated duct portion 992 and is biased to rest over its opening 993 when there is no inflow of feed of water through the inlet. The cup-shaped element is designed such that its cup-defining walls 998 are spaced from the walls of the elongated duct portion 992 to allow flow of water therebetween, namely in the space between the walls of the elongated duct portion and the cup-defining walls. FIG. 9A shows the state of the valve in its biased position, namely when there is no inflow of water through the inlet 991 and blocking element 996 is in the open state, therefore allowing flow of water between the first and second ports 994 and 995. Upon an inflow of feed of water through the inlet 991, the cup-shaped element 997 displaces along an axis Y defined by the elongated duct portion 992 such that it displaces the blocking element 996 to its blocking state, as shown in FIG. 9B, therefore allowing flow of water between the inlet 991 and the second port 995. The cup-defining walls are extending to a length that is greater than the maximal displacement length ML so as to ensure that the cup-shaped element maintains over the elongated duct portion 992 during the entire operation of the valve 900.

Figure 10:
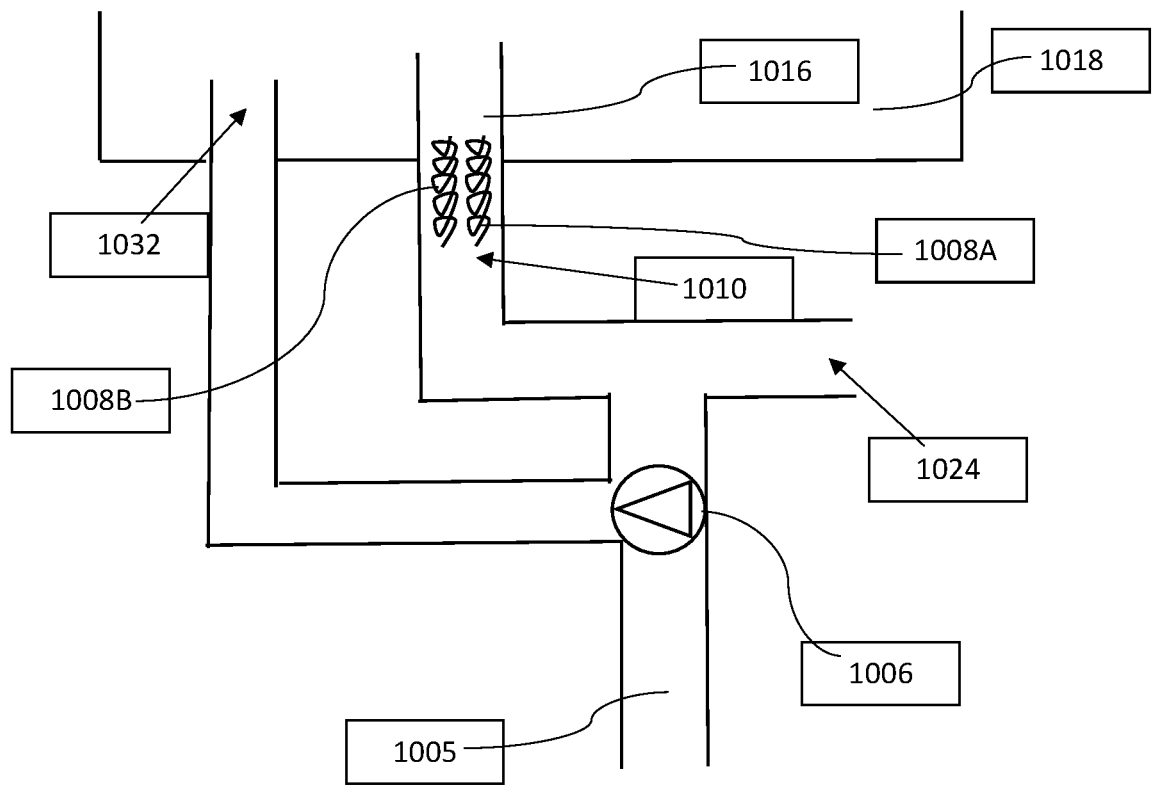
FIG. 10 is a schematic illustration of a non-limiting example of an embodiment of the water heating system of the present disclosure.

Reference is now being made to FIG. 10, which is a schematic illustration of a non-limiting example of an embodiment of the water heating system of the present disclosure. In this example, the water heating system comprises a single heating volume 1010 that includes two common heating bodies 1008A and 1008B that are completely overlap along the flow path defined by the heating volume 1010. A water inlet 1005 allows flow of fresh cold water to enter the system and a three-directions pressure-sensitive valve 1006 is configured to direct flow of fresh water towards the water container 1018 through the water container inlet 1032 upon consumption of hot water the flows through the outlet 1024. When there is no consumption of hot water and at least one of the heating bodies is active, the water circulates from the water container 1018 towards the heating volume 1010 and into the top portion of the water container 1018. In this solution, there are two conduits that allow two directional flow of water, the one that links between the pressure-sensitive valve 1006 and the water container inlet 1032 and the one that links between the pressure-sensitive valve 1006 and the top portion of the water container 1018 (through the heating volume 1010).

The invention claimed is:

1. A water heating system, comprising:
 a heating unit that comprises
    a lead water-heating body configured for heating water in a lead heating volume,
    at least one inlet for receiving a feed of cold water into said lead heating volume,
    a hot-water outlet downstream the lead water heating volume for egress of hot water from the heating unit,
    a two-directional port for allowing water flow into the heating unit upon egress of water through the hot-water outlet and water flow out of the heating unit when there is no water flow through the hot-water outlet;
    a two-directional conduit linking between said two-directional port and a top portion of a water reservoir for allowing two-direction water flow between the top portion of the reservoir and the heating unit; wherein the two-directional conduit is linking the heating volume and said top portion.

2. The water heating system of claim 1, wherein the heating unit comprises one or more following heating bodies configured for heating respective one or more following heating volumes downstream the lead heating volume and upstream the hot-water outlet, said one or more following heating bodies are switchable between active and non-active modes, said one or more following heating volumes are connected in to and in fluid communication with the lead heating volume and one another.

3. The water heating system of claim 2, wherein each of said one or more following heating bodies is associated with a respective temperature sensor configured to sense the temperature of the water at a respective following heating volume and/or along a flow path between a respective following heating volume and a most proximate upstream heating body, wherein each of said one or more following heating bodies is configured to switch to active mode upon sensing a temperature below a selected value in the respective temperature sensor.

4. The water heating system of claim 3, wherein the one or more following heating bodies are configured to switch to active mode when a pressure difference in the system exceeds a predetermined value.

5. The water heating system of claim 3, comprising a pressure-dependent switch configured to transmit power supply to the one or more following heating bodies upon sensing a pressure difference above a certain threshold at a selected location in the system, and to disconnect power supply upon sensing a pressure difference in the system below said threshold.

6. The water heating system of claim 2, comprising a manifold for directing ingress water from the inlet to the lead water-heating body at one side and a first following heating body at second side.

7. The water heating system of claim 2, wherein the one or more following heating bodies comprise at least a first and second following heating bodies configured for heating water in first and second following heating volumes, respectively; and wherein the system further comprising a following port linking between the first and second following heating volumes and a top portion of a water reservoir, said following port comprises a following pressure-sensitive valve for blocking a flow of water when a pressure difference in the following port is above a selected threshold.

8. The water heating system of claim 7, comprising a second inlet for feeding cold water to the second following heating volume, a third pressure-sensitive valve is disposed at the second inlet for blocking a feed of water when the pressure difference in the following port is above a selected threshold.

9. The water heating system of claim 7, wherein the flow path through the lead heating volume, the first and second following heating volumes defines a serpentine flow path.

10. The water heating system of claim 1, comprising a first pressure-sensitive valve disposed at or upstream the at least one inlet and configured for switching between an open state to a blocking state upon exceeding a certain threshold of water pressure difference or flow rate therethrough.

11. The water heating system of claim 1, wherein the heating volume comprises two or more common heating bodies, wherein one of the two or more common heating bodies is said lead water-heating body.

12. The water heating system of claim 11, wherein the two or more common heating bodies are sequential to one another along the flow path defined by the heating volume.

13. The water heating system of claim 11, wherein the two or more common heating bodies have a certain degree of overlap along the flow path defined by the heating volume.

14. The water heating system of claim 11, wherein each of the two or more common heating bodies comprises its independent temperature sensor.

15. The water heating system of claim 11, wherein the two or more common heating bodies are connected in a switchable manner between series and parallel connections; wherein the two or more common heating bodies are configured to be connected (i) in parallel upon egress of water through the hot-water outlet and (ii) in series when there is no water flow through the hot-water outlet.

16. A water heating system, comprising:
a heating unit that comprises
a lead water-heating body configured for heating water in a heating volume,
at least one inlet for receiving a feed of cold water into said heating volume,
a hot-water outlet downstream the lead water heating volume for egress of hot water from the heating unit,
a first two-directional port for allowing water flow into the heating unit upon egress of water through the hot-water outlet and water flow out of the heating unit towards a water container when there is no water flow through the hot-water outlet,
a second two-directional port for allowing flow of water between a bottom portion of the water container and the heating volume when there is no consumption of hot water, and flow of water between the at least one inlet and the bottom portion of the water container when there is a consumption of hot water through the outlet.

17. The water heating system of claim 16, comprising a three-direction pressure-sensitive valve linking the heating volume, the second two-directional port and the at least one inlet, and is configured for (i) allowing flow of water between the second two-directional port and the heating volume when there is no consumption of hot water and (ii) allowing flow of water between the at least one inlet and the second two-directional port when there is consumption of hot water.

18. The system of claim 16, comprising a first two-directional conduit linking the first two-directional port and the top of the water container and a second two-directional conduit linking between the second two-directional port and the bottom of the water container.

19. A water heating system, comprising:
a first heating unit that comprises
a lead water-heating body configured for heating water in a lead heating volume,
at least one inlet for receiving a feed of cold water into said lead heating volume,
a hot-water outlet downstream the lead water heating volume for egress of hot water from the heating unit,
a two-directional port for allowing water flow into the heating unit upon egress of water through the hot-water outlet and water flow out of the heating unit when there is no water flow through the hot-water outlet;
wherein the heating unit comprises one or more following heating bodies configured for heating respective one or more following heating volumes downstream the lead heating volume and upstream the hot-water outlet, said one or more following heating bodies are switchable between active and non-active modes, said one or more following heating volumes are connected in to and in fluid communication with the lead heating volume and one another.

20. A water heating system, comprising:
a first heating unit that comprises
a lead water-heating body configured for heating water in a lead heating volume,
at least one inlet for receiving a feed of cold water into said lead heating volume,
a hot-water outlet downstream the lead water heating volume for egress of hot water from the heating unit,
a two-directional port for allowing water flow into the heating unit upon egress of water through the hot-water outlet and water flow out of the heating unit when there is no water flow through the hot-water outlet;
wherein the heating volume comprises two or more common heating bodies, wherein one of the two or more common heating bodies is said lead water-heating body.

* * * * *